United States Patent
Reynolds

(10) Patent No.: US 6,957,619 B2
(45) Date of Patent: *Oct. 25, 2005

(54) HULL HAVING MINIMIZED WAVE-MAKING CHARACTERISTICS

(76) Inventor: Zachary M. Reynolds, 29 W. El Rose Dr., Petaluma, CA (US) 94952

(*) Notice: Subject to any disclaimer, the term of this patent is extended or adjusted under 35 U.S.C. 154(b) by 43 days.

This patent is subject to a terminal disclaimer.

(21) Appl. No.: 10/718,866

(22) Filed: Nov. 21, 2003

(65) Prior Publication Data

US 2005/0022713 A1 Feb. 3, 2005

Related U.S. Application Data

(63) Continuation-in-part of application No. 09/979,595, filed as application No. PCT/US00/13927 on May 18, 2000, now Pat. No. 6,668,743.

(60) Provisional application No. 60/134,743, filed on May 18, 1999.

(51) Int. Cl.$^7$ ................................................ B63B 1/00
(52) U.S. Cl. ..................................... 114/56.1; 114/61.3
(58) Field of Search .................. 114/56.1, 61.27–61.32

(56) References Cited

U.S. PATENT DOCUMENTS 2,347,077 A * 4/1944 Starling ..................... 114/61.3
4,712,499 A * 12/1987 Haruguchi et al. ....... 114/77 R

* cited by examiner

Primary Examiner—Ed Swinehart
(74) Attorney, Agent, or Firm—DLA Piper Rudnick Gray Cary US LLP

(57) ABSTRACT

A hull form is presented and dimensioned where the design parameters consist principally of the breadth of the hull at the waterline, taken at specific equal intervals along the length of the waterline. The waterline reference is that at which the vessel is intended to float in the loaded condition. The waterline breadths describe the entrance or bow of the vessel. The closing run or stem of the vessel is not specifically delineated as a feature of the entrance or related to it. The invention defines two parts of the vessel, the entrance and the run, as discrete segments, each having its own properties and advantages. The entrance of the vessel is concerned with wave-making and the creating of a wave front that opposes vessel forward motion. The invention describes a method of optimizing the entrance of a vessel, and modifying the entrance of an existing vessel to minimize wave-making characteristics.

33 Claims, 11 Drawing Sheets

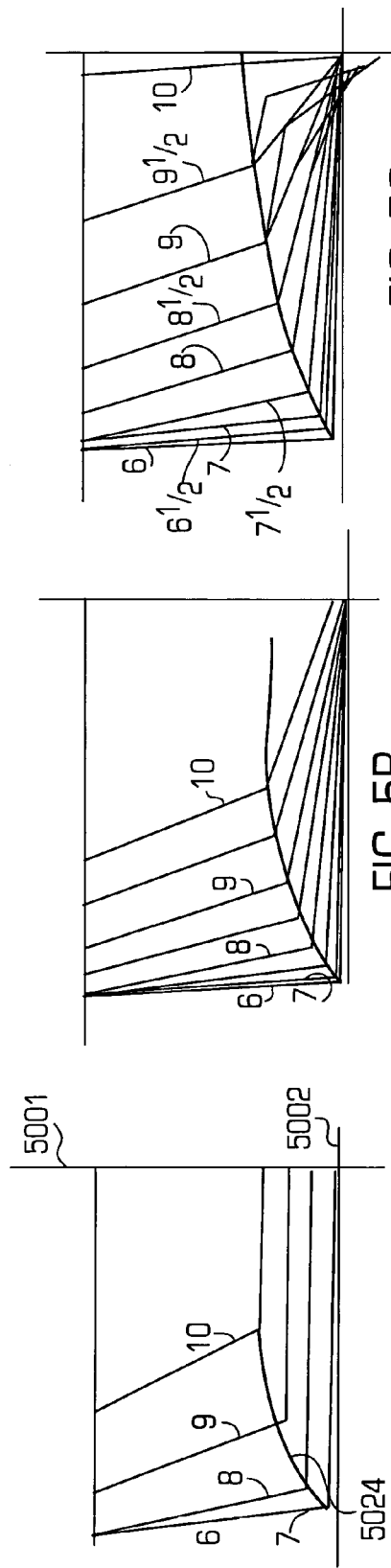
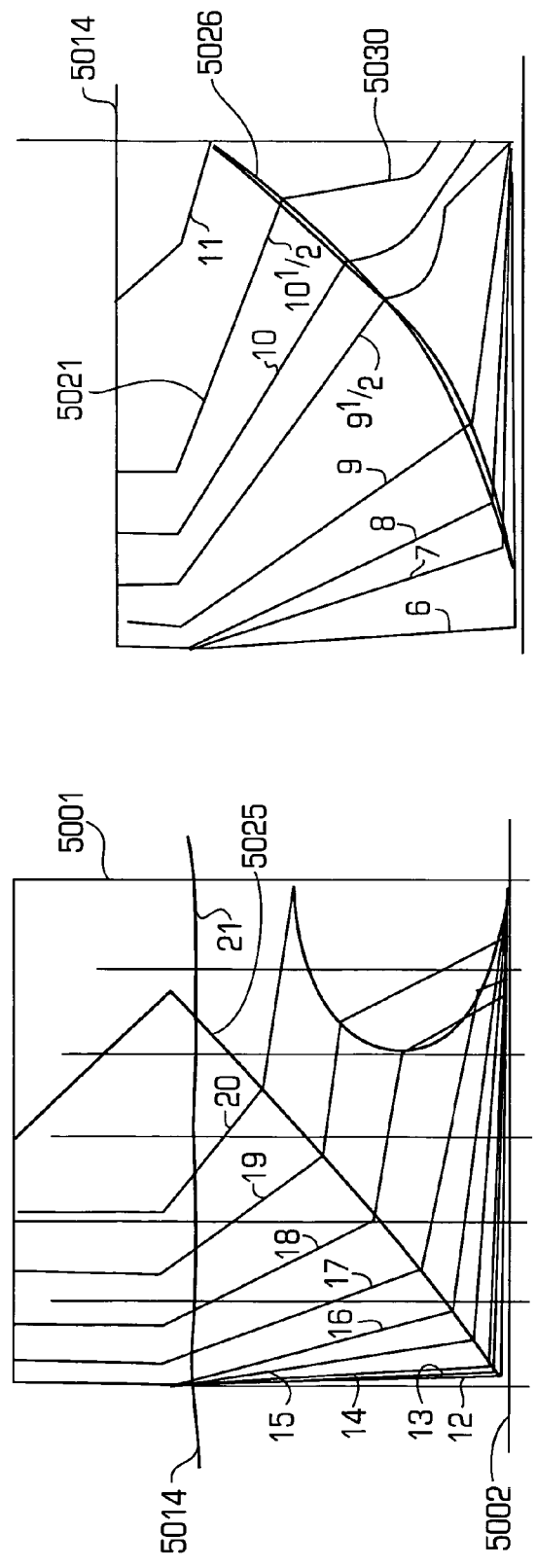

HULL HAVING MINIMIZED WAVE-MAKING CHARACTERISTICS

CROSS REFERENCE TO RELATED APPLICATIONS

This application is a continuation-in-part of U.S. patent application Ser. No. 09/979,595, filed on Mar. 4, 2002 now U.S Pat. No. 6,668,734, which is fully and completely incorporated by reference, and which claims priority and is a 371 of PCT International Application Serial Number PCT/US00/13927 filed on May 18, 2000 claiming priority from an earlier U.S. Provisional Patent Application Ser. No. 60/134,743 filed May 18, 1999, both of which are incorporated by reference.

FIELD OF THE INVENTION

This invention relates generally to vessels. More specifically, the invention relates to a vessel having a hull form that is configured to reduce the wave-making characteristics of the vessel operating as a full displacement hull, where planing effects do not exist.

BACKGROUND OF THE INVENTION

It is desirable to reduce wave-making characteristics in the hulls of water vessels, such as full displacement hulls. The vessels which can benefit from the design arrangements specified here include those which operate at speeds where wave-making can prove to be significant, usually at speeds where the ratio of speed in knots to the square root of the vessel length is in the range of 0.20 and above.

Traditional approaches to hull design are based upon classic hull forms typified by studies of a series of hulls, such as the Taylor Series and Series 60. These Series utilize hull configurations that vary section areas as decreasing segments as the section increases in depth. Such that in the bow and stern sections, the forms are of decreasing width as the section increases in depth below the waterline. This traditional approach creates compound curvatures in hull plate surfaces and simplex curvature in hull frame sections.

The non-traditional approach to hull design and performance proposed in the parent of this application, i.e., application Ser. No. 09/979,595 of Reynolds, avoids expensive plate and hull shapes. Although the '595 application focused on semi-displacement hulls (i.e., hulls where at least some planing is present), certain concepts of the non-traditional approach may be applied to full displacement hulls. In this non-traditional approach, hull sections are developed as straight, with hard chines that develop bottom deadrise. Wave-making reduction is developed longitudinally rather than vertically (as in the traditional Series forms). This means that hull separation of the lo incident water stream is accomplished by extending the entrance (or bow form), where the parallel midbody is non-existent, rather than decreasing separation potential energies as depth increases.

The concept of a parallel midbody is a traditional approach for minimizing hull form variations and optimizing construction costs. Non-traditional hull design eliminates the parallel midbody and minimizes station configuration. This minimization results in straight sides, and does not create compound curves for the side shell. Non-traditional straight transverse sided sections reduce or eliminate compound curvature. Non-traditional straight sided transverse sections, as presented herein, create midbody plate panels that are essentially straight (e.g., infinite radius of curvature) but may not be parallel to the centerline. The midbody may be more trapezoidal than rectangular.

The present invention teaches that low wave-making can be defined by waterline sections. By dividing the length of the hull into substantially equally spaced intervals, called sections, the beam, or offset, at the waterline of each section can be specified. The principal waterline section is the water surface where wave-making energies are the highest. This is the free surface waterline, or the water surface. Wave-making extends below the water surface, but the greatest energies which react against the hull to impede motion are encountered at the water surface. The waterline profile at the water surface can be represented by a series that describes the second order difference of the station offsets.

The waterline profile can be divided into entrance offsets (bow) and run offsets (stern). Bow and stern offsets can be treated as discrete. Even though a vessel's overall efficiency depends upon the combined effects of bow and stern, they are not dependent upon each other to create separation and closing effects.

Thus, it is desirable to provide a vessel design and configuration that relies upon non-traditional approaches to reduce wave-making drag in a full displacement hull, and it is to this end that the present invention is directed.

SUMMARY OF THE INVENTION

The '595 application provides a hull form that operates in the speed ranges where both planing and wave-making affect hull resistance with a configuration which reduces wave drag and improves performance in very fast and ultra-fast speed ranges. The hull form is constructed so that there are variations in the distribution of immersed cross-sectional area that affect wave-making resistance. The specific distribution of immersed cross-sectional area minimizes bow wave-making and optimizes the closing wake. The bow wave impedes forward motion of a hull form. The stern closing wake pushes the hull forward and enhances the forward motion. The bow sections are designed so that they have a "hollow" entrance configuration, which decreases the effort to spread the water and in turn diminishes the wave-making as the hull pushes through the water. The stern sections are designed to be of such a configuration that as the water spread by the bow now must close in around the stern of the hull, the wave height is increased so that the closing wake exerts a forward thrust on the hull. The stern wave caused by hull shape, is augmented or made higher, so that the bow sections reduce the wake height and the stern sections increase the wake height. The keel line at the bow has a slight upward slope to allow for thinner bow sections and create hollow waterlines forward. The aft keel line has a long slope up and aft to allow for fuller and more nearly rectangular stern sections and create convex waterlines which form a slightly rounded side in the after body. Curving the afterbody section in towards the hull centerline increases the advantage of the closing thrust created by the stern wake. The sections aft of midships are all designed as low deadrise, hard chine sections where the dynamic lift surface for planing is optimized. While these bow and stern designs complement each other as described above, a hull implementing just the novel bow or stern design may be formed and offer the respective advantages provided by the bow or stern design. The bow and stern portions of the vessel (i.e., the entrance and run, respectively) can be defined as discrete segments, each having its own properties and advantages.

A semi-displacement hull in accordance with the '595 application significantly reduces the wave-making drag of the hull at the high speed range (TQ=2.0) of vessel operation thereby allowing the vessel to reach ultra-high speeds where planing characteristics dominate hull behavior. The semi-displacement hull also includes an aft body that is developed for planing. The semi-displacement hull also may include derivative hull configurations, from a set of formulas, where hull coefficients may be varied. The invention also provides a multi-hulled high speed or ultra-high speed vessel using the semi-displacement hull.

In one embodiment, the invention is a vessel intended for high and ultra-high speed operation and use in a semi-displacement mode where wave-making and planing characteristics are present. The vessel has a semi-displacement hull with a semi-displacement forebody and an afterbody developed for planing. The hull form is characterized by an immersed sectional area distribution and immersed sectional area providing a volume with concave surfaces in the forebody and convex surfaces in the afterbody. The forebody extends about 0.6 times the length between perpendiculars of the hull (0.6 L) from the stern, and the afterbody extends thereafter to the stern. The stern is raked forward so that the waterlines from the stern to about 0.4 of the distance from the stern to the stern form concave contours, and the length of the bow keel slope is about one tenth the waterline length of the vessel. The bow keel has a slope less than 0.067 radians. The aft keel slopes up and aft at about 0.69 L from the stern and extends to the transom. The keel begins to slope up and aft about 0.31 L from the stern, and the elevation of the stern rise is less than about 0.027 radians.

In one embodiment, the hull of the invention has specific parameters. For example, the average of the beam at the immersed chine and the beam at the load waterline, where B is the maximum beam at the waterline, H is the design draft, Ax is the maximum immersed cross sectional area, and B(n) is the average beam at tenths of the waterline length along the waterline is given by the following:

$B(2)=(0.388)(B)$ if $[2HB-(1.395)Ax]/B$ is less than $H$;

$B(3)=(0.664)(B)$;

$B(4)=(0.838)(B)$;

$B(5)=(0.936)(B)$; and $B(6)=(0.976)(B)$.

It should be appreciated that the foregoing equations include and provide precise values according to one embodiment, but that approximate and/or less precise values may be used without departing from the spirit and scope of the present invention. For example, the values contained in and provided by the equations may vary in the range of at least 5% without a significant effect on performance.

Likewise, for high and ultra high speed operation, the immersed sectional area, An, at each one tenth of the distance from stern to stern, where n=1 through 11, and Ax is the maximum immersed cross sectional area, is given by:

$A1=(0.0334)Ax$;

$A2=(0.2707)Ax$;

$A3=(0.5735)Ax$;

$A4=(0.7903)Ax$;

$A5=(0.922)Ax$;

$A6=(0.982)Ax$;

$A7=Ax$;

The stern sections or "run" for n=8 through 11, for high speed planing is given by:

$A8=(0.982)Ax$ $A9=(0.891)Ax$;

$A10=(0.701)Ax$; and $A11=(0.458)Ax$.

Again, it should be appreciated that these equations include and provide precise values according to one embodiment, but that approximate and/or less precise values may be used without departing from the spirit and scope of the present invention. For example, the values contained in and provided by the equations may vary in the range of at least 5% without a significant effect on performance.

The hull form may be further characterized by the following parameters in the portion of the hull where the transition from displacement to planing occurs, that is, at approximately seven tenths of the distance from stern to stern, the hull may be characterized by:
  (a) an average beam $B7=(0.993)(B)$,
  (b) a height of the chine, $C7,=2[H(B7)-Ax]/(B7)$, where Ax is the maximum immersed cross sectional area;
  (c) a height of the keel, K11 at the stern above a base line is $K11=2(H)-C7-[(1.7058)(Ax)]/(B)$;
  (d) the slope of the keel, $RK11,=K11/[(0.31)(L)]$;
  (e) the height of the keel, Kn, at a station, n, aft of station 7, where n=8 through 11, is $Kn=[(n-1)(L/10)-(0.69)(L)](RK11)$; and
  (f) the average of the beam at the chine and the beam at the load waterline, $(Bn)=2(An)/(2H-Kn-C7)$.

Again, it should be appreciated that these equations include and provide values according to one embodiment, but that approximate and/or less precise values may be used without departing from the spirit and scope of the present invention. For example, the values contained in and provided by the equations may vary in the range of at least 5% without a significant effect on performance.

Further hull parameters may include the rise of the aft keel, measured from at least about 0.69 L aft from the stern to the stern, has an aft keel slope that is less than about 0.027 radians from the horizontal line of the design baseline, a deadrise from about 0.7 L aft of the stern to the stern that is less then 18 degrees, and a rise of the bow keel less than about 0.067 radians, extending from the stern to about 0.1 L aft of the stern to enable a concave waterline profiles in the forward sections of the hull.

In this way, the invention provides an ocean-going cargo vessel capable of high speeds where a combination of low wave drag and planing lift cause a reduction in powering requirements over other conventional hull forms. The invention also provides a vessel which has a suitably large block coefficient providing sufficient cargo capacity to create suitable revenues to justify the vessel's use.

According to the invention, low hull resistance and reduced wave-making are attained by a specific distribution of immersed cross-sectional areas, related to a specific design waterline draft, that creates a volume with concave surfaces in the forebody and convex surfaces in the afterbody and a specific alignment of the keel in reference to the baseline. The length of the forebody, or run of the entrance, is about 0.6 L from the forward point at the stern of the hull. The bottom surfaces of the hull are narrow with a high deadrise in the forebody and decrease as the entrance approaches the section of maximum cross-sectional area about 0.6 L from the stern and then continue on to the stern with a relatively low deadrise. The planing surfaces must be broad and relatively flat in order to optimize the lift provided by bottom pressures. This characteristic of broad, flat sections increases the wave-making and is often at odds in very fast and ultra-fast hull designs. According to the invention, the wave-making of the broad planing areas of the hull are used to add a forward component of thrust due to the closing wake generated by these broad planing areas.

A natural extension of hull area distribution is to use form modifiers, which vary the area distribution of existing hulls to conform to the optimized distribution, as proposed by this invention. For example, appendages to the side of the hull or sponson-like additions acting as form modifiers may be positioned where they are always immersed in a semi-displacement hull and operate effectively to reduce wave-making.

According to the present invention, the waterline profile of the hull is divided into entrance offsets (bow) and run offsets (stern). Bow and stern offsets can be treated as discrete. Even though a vessel's overall efficiency depends upon the combined effects of bow and stern, they are not dependent upon each other to create separation and closing effects. Therefore, the present invention may be used to design or modify an improved hull that implements either the bow or stern offset design taught herein, or that implements both the bow and stern offset designs.

The foregoing concepts, parameters and equations may further be applied to a full displacement hull, such as a tanker hull. Applying these concepts to a full displacement hull improves entrance and minimizes wave-making characteristics. In one embodiment, sponsons may be used to create the waterline offsets. This concept allows a forward portion of a vessel to be fitted to an existing engine room, or to improve the overall efficiency of the existing vessel. For instance, bow sections can be modified by sponsons to create the correct ratios of Bn/B as specified in this invention.

According to one aspect of the present invention, the waterline profile at the water surface can be represented by a numerical series which describes the second order difference of the station offsets at the load waterline. Accordingly, a vessel may be provided including a hull having a block coefficient less than about 0.6, a load waterline, and a chine that is above the load waterline at a first waterline station, wherein the hull is characterized by second order of differences between waterline station offsets that are substantially represented by the following equations:

$Delta2_1 = 0.33(B)$ $Delta2_2 = -0.054(B)$ $Delta2_3 = -0.11(B)$ $Delta2_4 = -0.080(B)$ $Delta2_5 = -0.042(B)$ $Delta2_6 = -0.031(B)$ $Delta2_7 = -0.056(B)$ where $Delta2_n$ is the second order difference at the first seven waterline station offsets which are located at tenths of the distance from stern to stern, where n=1 through 7, and B is a maximum waterline beam.

Alternatively, a vessel may be provided including a hull having a block coefficient greater than about 0.6, a load waterline and a chine that is below the load waterline at a first waterline station, wherein the hull is characterized by second order of differences between waterline station offsets that are substantially represented by the following equations:

$Delta2_1 = 0.26(B)$ $Delta2_2 = -0.0042(B)$ $Delta2_3 = -0.077(B)$ $Delta2_4 = -0.068(B)$ $Delta2_5 = -0.062(B)$ $Delta2_6 = -0.023(B)$ $Delta2_7 = -0.064(B)$ where $Delta2_n$ is the second order difference at the first seven waterline station offsets which are located at tenths of the distance from stern to stern, where n=1 through 7, and B is a maximum waterline beam.

The novel features of this invention, as well as the invention itself, will be best understood from the following drawings and detailed description.

BRIEF DESCRIPTION OF THE DRAWINGS

FIGS. 5A–E are diagrams of various possible combinations of stern and after body hull forms which can be combined with the bow section shown in FIG. 4, according to the present invention.

DETAILED DESCRIPTION OF A PREFERRED EMBODIMENT

The present discussion applies the principles disclosed in the '595 application, which is fully and completely incorporated herein by reference, to a full displacement hull. While the following discussion relates to a full displacement type hull, such as a tanker hull, it should be appreciated that the invention is applicable to both full displacement hulls and semi-displacement hulls, and that the teachings of the invention may be applied to design hulls that are being manufactured or to modify existing hulls. Furthermore, although the invention provides design concepts for both the forebody (e.g., bow portion) and afterbody (e.g., stern portion) of a hull, the advantages provided by the bow and stern offset designs are not dependent upon each other to create separation and closing effects. Thus, the present invention may be used to design or modify an improved hull that implements either the bow or stern offset design taught herein, or that implements both the bow and stern offset designs.

Figure 1:
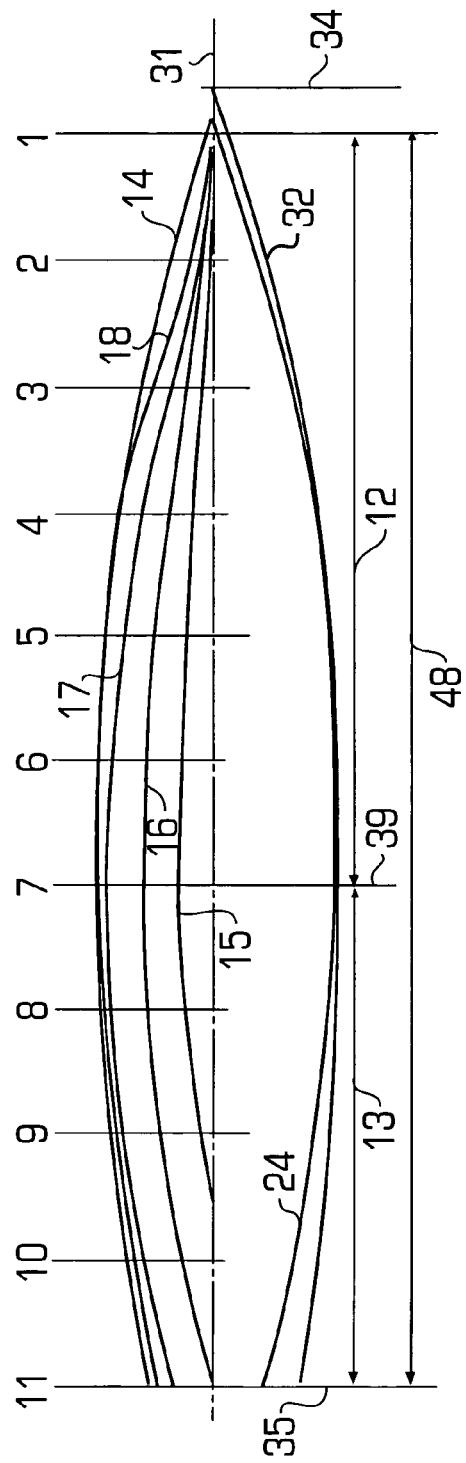
FIG. 1 is a diagram illustrating a bottom view of a hull form showing the waterlines of the hull, according to the present invention.
Figure 2:
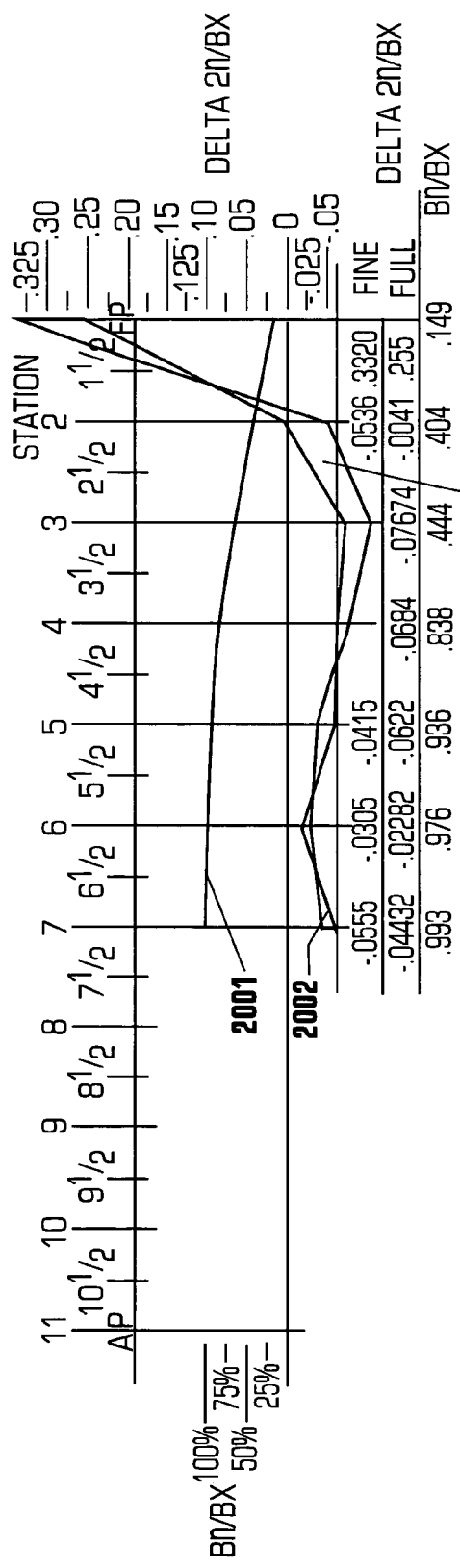
FIG. 2 is a diagram illustrating the waterline beam ratios (Bn/Bx) and second order differences (DELTA2n/Bx) for the bow section of the hull shown in FIG. 1.
Figure 4:
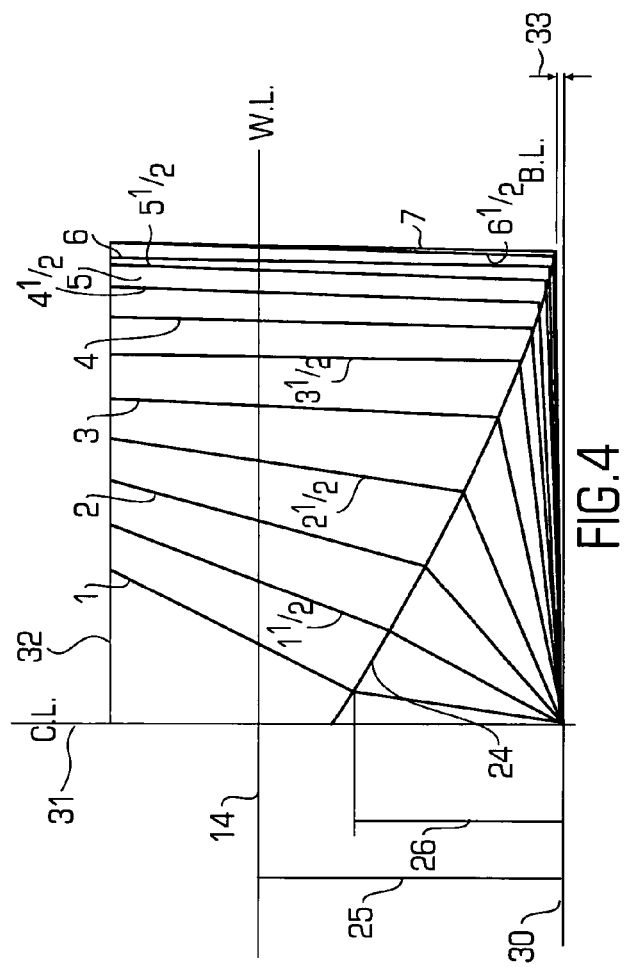
FIG. 4 is a diagram illustrating a tanker bow body hull form, according to one embodiment of the invention.

FIG. 4 shows a body plan of the bow portion of a full displacement hull where transverse sections 1 through 7 are shown as outlines. In one embodiment, the full displacement hull may be a tanker hull. Each section, 1 through 7, is represented as a contour line which runs from the centerline 31 of the hull form out to the chine 24 and then up to the deck level 32. (FIG. 1 shows all 11 sections of the hull). Each hull section has a slope angle 33 from the centerline to the intersection with the chine 24. At each station 1 through 7, the chine 24 is a specific height 26 above the baseline 30. The vertical dimensions of the hull are measured from the baseline 30. The horizontal dimensions of the hull are measured from the centerline 31 out to a point on the outer surface of the hull station in question. All section contour lines are straight lines from the centerline to the chine. Horizontal slice 14 through the transverse sections 1–7 is referred to as a "waterline" and represents the line of the water along the length of the hull if the hull were floating at the respective level 14 above the baseline 30. The offset dimensions of each station 1–7, and their half-stations, at the load water line 14 is represented in the invention as a second difference between adjacent water line offsets as Delta2n, 2002 as shown in FIG. 2.

Variations in immersed sectional area distribution of the hull affect wave-making resistance. The basis for this approach rests in the well-known fundamental principals that define "linearized" velocities of an inviscid irrotational fluid, postulated by J. H Michell in 1898. Although the "thin ship" theory of Michell requires a vessel of infinitely small beam, the so-called "Michell Integrals" have been applied to vessels of finite fullness, specifically by T. H. Havelock, G. P. Weimblum, and R. Guilloton. It has been demonstrated that a hull can be represented as a summation of simple geometric wedges and that pressure disturbance can be calculated for an elementary wedge using the Michell potential functions. This leads to the conclusion that an optimized hull form, which minimizes wave-making, can be represented as a series of immersed areas that are elementary hull form "wedges", developed as the second differences of the station offsets. The body plan in FIG. 4 shows the contours of the sections and these contours define the area of each section. The immersed sectional areas are measured down from the design waterline, and are a measure of the complete immersed section irrespective of "design baseline" reference points. Any hull can be defined in terms of its distribution of immersed area over the entire length of the hull. In the preferred embodiment of immersed sectional area distribution, the sections 2 and 3 show a rapid increase in area compared to section 1 and 4. This distribution in area at the two points results in a hollow or concave configuration to the waterlines at these stations. The effect of this is to shift principal bow wave-making aft into the region where wave pressure acting against the hull in the direction of motion is less due to the fact that station sections, at this point, present a smaller differential plane area to the wave profile and hence less lateral pressure affecting forward motion.

Figure 19:
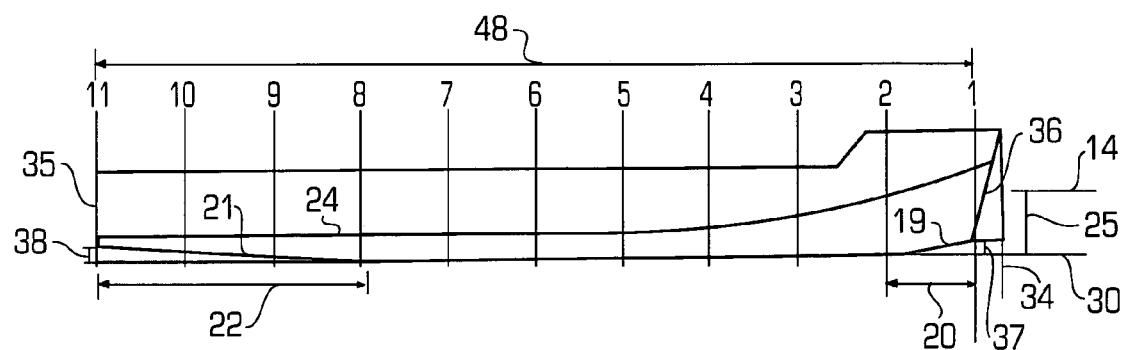
FIG. 19 is a side view of the hull shown in FIG. 1.

Referring to FIG. 19, from the forward most position 34 oil the bow of the vessel, the chine 24 has a vertical height 26 (FIG. 4) that starts out high above the baseline and diminishes to a lower height above the baseline at section 6, the midpoint of the hull. From the section 6 running aft to the section 11 the chine may be a straight line at a substantially constant height 26 above the base line 30. This configuration of the chine establishes the planing surface, as opposed to wave-making forms of the hull. Locating the planing surface aft of the bow sections, which tend to create the most wave drag, ensures that the full convex forms required for effective planing surfaces do not compete with the narrow and concave sections required for reduced wave drag.

The design draft 25 of the vessel is above the level of the chine 26 at station 6 through 11. The ratio of design draft to chine height controls the degree of concavity of the forward waterlines. An excessive draft compared to the height of the chine will defeat the principal embodiment of the invention by creating convex waterlines forward and will alter the sectional area distribution of the immersed hull form.

FIG. 1 illustrates a plan view of the hull viewed from below looking up at the waterlines. The locations of the transverse sections 1 through 11 are shown. Each waterline 14 through 18 is shown as a contour where that waterline would delineate the shape of the hull running from bow 34 to stern 35 at the specific height of that waterline above the baseline 30. The contour of the chine 24 is also shown from below looking up. The contour of the main deck 32 is shown from below looking up and extending from the forward most point 34 of the bow to the stern 35. The contour of each waterline 14 through 18 is shown from below looking up. Waterlines 15 to 18 are in the lower ⅛th division of the design waterline, where waterline 18 is one-half the height of the design waterline above the baseline 30. The entrance 12 of the hull is the length measured from the first transverse station 1 to the point of maximum sectional area 39. The length of the entrance extends from station 1 to station 7.

As discussed in the '595 application, the hull shape follows a specific pattern of immersed cross-section areas which minimize bow wave drag and maximize stern closing thrust. Bow stations begin thin, with low area ratio, then build to fuller areas as the stations reach midships. This creates hollow or concave waterlines in the forward bow sections of the hull. Forward stations and midships stations have larger area ratios as they build to the station of maximum immersed cross-sectional area. This creates fuller or rounded waterlines in the midbody sections of the hull. The section of maximum immersed cross-sectional area is located aft of the midpoint of the hull. After stations have full stations near the midpoint then decrease in area as the stern is approached. This creates full or convex waterlines as they close towards the stern of the vessel.

It can be seen from FIG. 1 that the forward immersed stations, which form the entrance, cause the waterlines to have a definite concave characteristic. In order for this characteristic to be advantageous in diminishing wave making, according to '595 application, the immersed sectional areas must have a specific relationship as expressed in the dA/dL curve 41 shown in FIG. 3.

Aft of station 6, the chine runs at an increasingly acute angle tending to intersect the center-line 31 and diverging from the line of the main deck 32. From the forward most point of the bow 34 to the approximate tangent point with the line of the main deck, the chine 24 is concave to the line of the main deck 32. All waterlines 15 through 18 below the load waterline 14 are concave from the forward perpendicular 1 at the bow to station 4.

All waterlines 15 through 18 from station 6 to the stern 35 are convex and intersect or tend to intersect the centerline 31. The entrance chine 24 reaches its maximum offset from centerline at the point 39 of maximum immersed sectional area. The length of the entrance 12 (Le) is about 60% of the length between perpendiculars (L) 48 (FIG. 19).

The run 13 is measured from the point of maximum immersed sectional area 39 to the last transverse station 11 at the transom 35 of the hull. There is no parallel midbody or length of the hull where the immersed cross-sectional area is constant. The run begins at the point 39 where the entrance ends. It can be seen from the drawing that the afterbody stations, which form the run, cause the waterlines to have a definite convex characteristic. This characteristic is advantageous in increasing stein wave propagation, according to the preferred embodiment of the invention, when the sectional areas have a specific relationship as expressed in the dA/dL curve. The chine 24 is shown to run tangent to the line of the main deck 32 between sections 4 and 6, which indicates vertical sides between the chine and the main deck. In other versions of the invention, the line of the main deck may not be tangent to the chine at any point in the vessel's length indicating that the sides may flare out from the chine.

FIG. 19 illustrates the profile of the hull. This figure shows the length between perpendiculars 48 and other basic reference points of measurement for the stations 1, the forward perpendicular, through 11, the after perpendicular, and the slope of the keel forward 19 and the slope of the keel aft 21. Station 1 is located at the intersection of the bow stern 36 to the slope of the bow keel 19. Each station from station 1 is measured in equal parts so that the station spacing is 1/10th the distance from station 1 to station 11. The stern is raked forward so that waterlines 15 through 18 form concave contours between stations 1 through 4. The bow keel line 19 is sloped up from the baseline 30 so that waterlines 15 through 18 form concave contours between stations 1 through 4. The length of the bow keel slope 20 is about 0.1 L, a ratio of the length from station 1 to 11. The elevation of the bow slope 37 is preferably not greater than about 0.067 radians. The aft keel 21 slopes up and aft at about 0.69 L from station 1 and extending to the transom 35 (and station 11). The keel begins to slope up and aft a specific distance 22 (about 0.31 L) from the stern 35. The elevation of the stern rise 38 is not greater than about 0.027 radians. Stern rise is determined by a direct calculation which involves draft, chine height and sectional area as coefficients. The chine 24 begins high on the bow 36 and gradually slopes down to a point at station 7 where it runs to the stern 35 as a straight line parallel with the base line 30. The line of the keel follows a specific shape which is a result of hollow waterlines forward and full convex waterlines aft. The forward keel line, at the bow, rakes up towards the stern allowing immersed bow section areas to be thin and forward waterlines to be hollow. The after keel line slopes up from the midbody towards the stern. This allows the immersed stern section areas to decrease and to maintain convex waterlines as they close aft at the transom.

Figure 3:
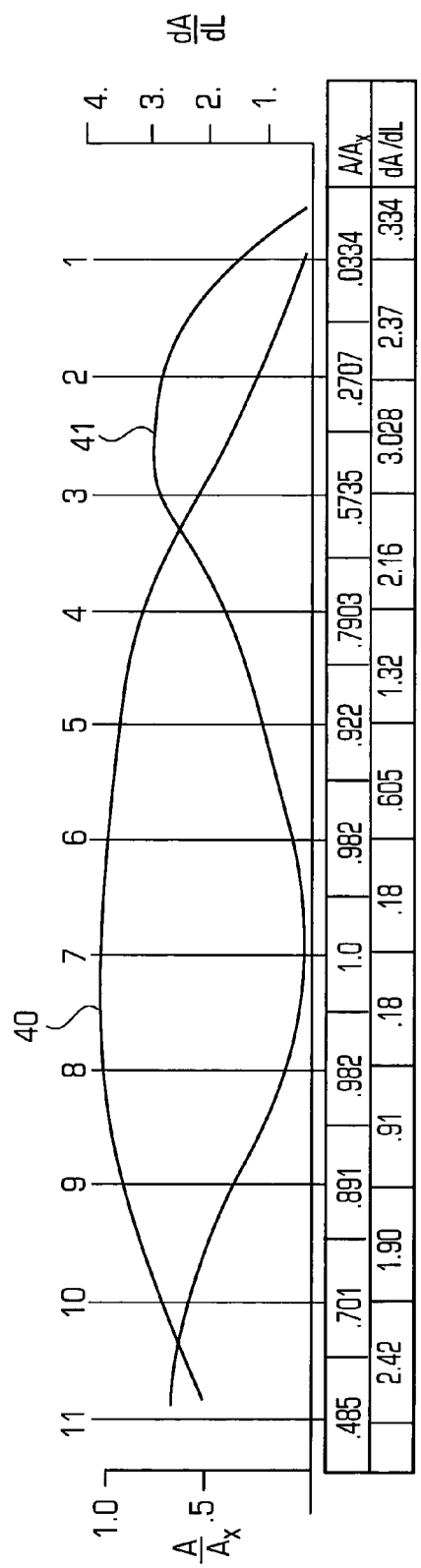
FIG. 3 is a diagram illustrating the cross-sectional areas of the immersed sections of the hull shown in FIG. 1.

Cross-sectional areas 40 of the immersed sections of the stations 1 through 11, shown in FIG. 3, have a specific relationship to each other. The relationship can be expressed in terms of a curve which shows the rate of change of the immersed section area at a given station per unit change in length. Numerically this is the change in the immersed section area, expressed as a percentage of the immersed area at the maximum section, for one percent change in length. This relationship showing the rate of change can be expressed as a non-dimensional rate of change per increment of length of the vessel, as stated in the absolute expression:

$$dA/dL = |A_n - A_{n-1}|/(Ax)(0.1)$$

These values (dA/dL) are shown graphically as a curve 41 plotted over the length of the vessel. The large dA/dL values in the first three stations 1 through 3 characterize the hollow waterlines 14 through 17 that are shown on FIG. 1. As the hull shape becomes fuller at the midbody, the dA/dL curve diminishes and reaches its lowest value at station 7 just aft of the midbody. As the aft stations begin to diminish in immersed sectional area from the maximum at station 7, the dA/dL curve begins to rise. In association with the rising keel line, this causes the afterbody stations to be convex to the line of the main deck and is characteristic of the waterlines which slope in towards the hull centerline, as seen in FIG. 1.

In addition to use in semi-displacement hulls as taught in the '595 application, the invention is particularly applicable to low and medium speed hulls.

The present invention provides a hull form, which operates in the speed ranges where wave making affects hull resistance, with a configuration that reduces bow wave drag and improves performance in moderate and fast speed ranges. The hull form is constructed so that there are variations in the distribution of immersed cross-sectional area that affect wave making resistance. The specific distribution of immersed cross-sectional area minimizes bow wave. Bow wave impedes forward motion of a hull form. The bow sections are designed so that they have a "hollow" entrance configuration, which decreases the effort to spread the water and in turn diminishes the wave making as the hull pushes through the water. The keel line at the bow has a slight upward slope to allow for thinner bow sections and create hollow waterlines forward.

As shown in FIG. 2, the distribution of the averages of the beam at the immersed chine and the beam at the load waterline of the stations 1 through 7 have a specific relationship to the maximum waterline beam (B) at station 7. The relationship can be expressed as a curve, which shows the ratio as a fraction of the maximum beam (Bx). These values (Bn/Bx) are shown graphically as a curve 2001 plotted over the entrance (Le) of the invention, where Bn=the average of the beam at the immersed chine and the beam at the load waterline; and Bx=maximum beam at the load waterline.

The Bn/Bx values 2001 (FIG. 2) in the first three stations 1 through 3 characterize a relatively smooth entrance with little curvature at the load waterline 14 (FIG. 1). At station 4, the Bn/Bx value, although high, does not change as rapidly as the forward stations. This indicates a transition point where the curvature of the waterline along the length of the vessel pulls in towards centerline.

According to the invention, the characteristic of wave making in the forward sections of the vessel has been identified as a direct relationship to the rate of change of the curvature of the stations that make up the entrance. This rate of change is expressed as the second order of differences 2002 between stations based upon 11 stations from stern to stern. Each difference, designated Delta2$n$/Bx (and represented by curve 2002 of FIG. 2) is defined as the difference between the first offset differences of the stations adjacent to station (n) and is expressed as a fraction of the maximum beam Bx, where:

$$\text{Delta2}_n = Bd_{n+1} - 2Bd_n + Bd_{n-1}$$

And

Bx=maximum beam at the load waterline

As previously discussed, an optimized hull form, which minimizes wave making, can be represented as a series of immersed areas that are elementary hull form "wedges", developed as the second differences of the station offsets.

It is also demonstrated that the significant wave making occurs at the fluid interface between air and water, such that water wave elevations into the less dense air are significantly greater than those below the fluid interface where water is theoretically uniform in density. As a consequence the disturbance of the water surface by a piercing body influences wave making, and consequently wave drag, more than at lower depths below the water surface, all other factors remaining equal. The form of this piercing body at the water surface is expressed as the second order difference 2002 between adjacent station offsets (FIG. 2). In the same way, the optimal shape of the forward stations, where n=1 to 7, will vary slightly between fine and full hull forms, since the range between fine and full involves different masses tending to spread the water. Accordingly, these optimal form variations are represented as an envelop 2003 of Delta2$n$/Bx values within which the actual curve of the water line is represented.

Figure 21:
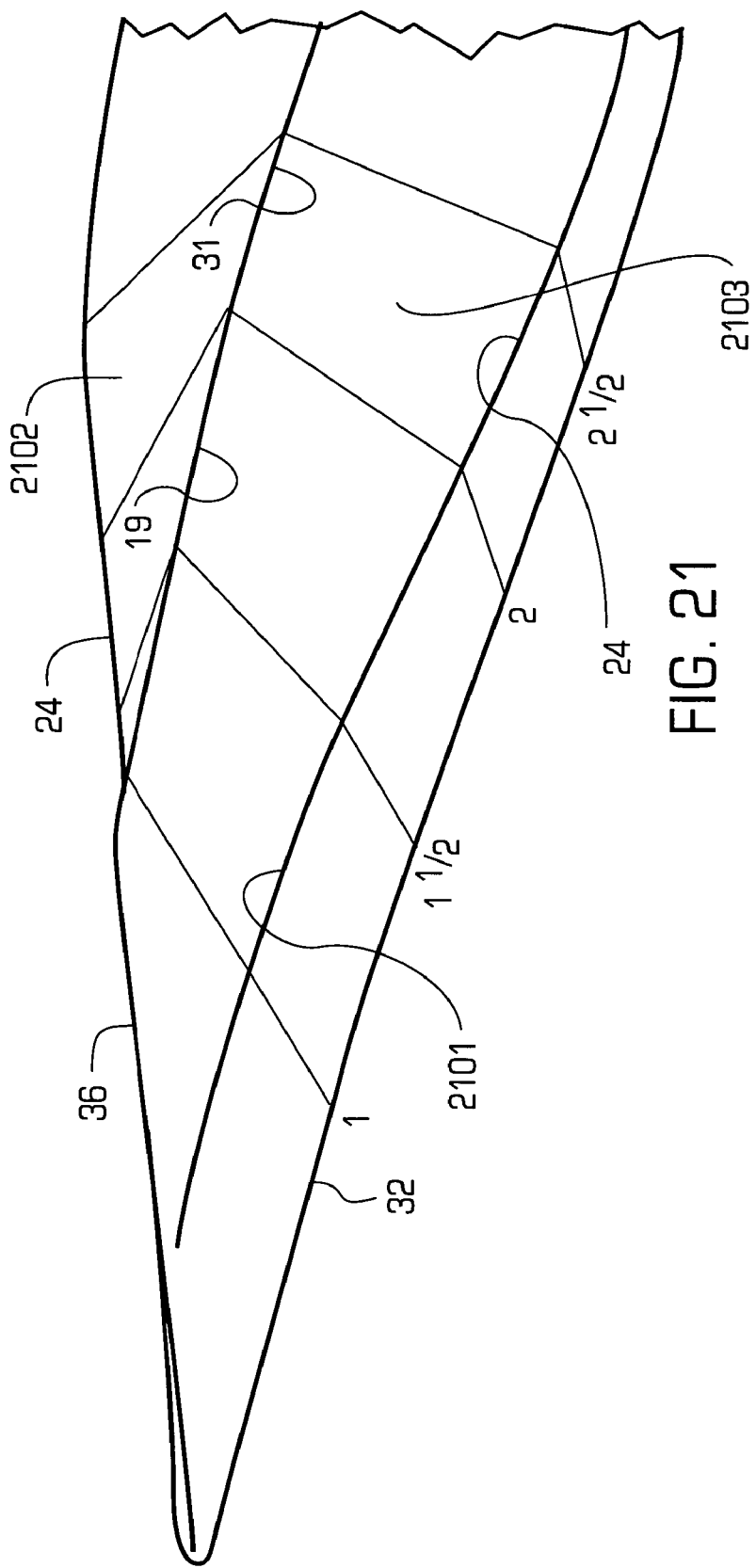
FIG. 21 is a perspective view of an embodiment of the characteristic bow form of the invention.

It can be seen from FIG. 1 that the forward immersed stations, which form the entrance, cause the waterlines to have a definite concave characteristic in the bow, as shown in the three-dimensional perspective of FIG. 21. In order for this characteristic to be advantageous in diminishing wave making, according to the preferred embodiment of the invention, the immersed sectional areas have a specific relationship as expressed in the dA/dL curve (FIG. 3).

Referring to FIG. 1, from the forward most point of the bow 34 to the approximate tangent point with the line of the main deck, the chine 24 is concave to the line of the main deck 32. All waterlines below the load waterline 14 are concave from the forward perpendicular 1 at the bow to station 4. All waterlines from station 6 to the stern 35 are convex and intersect or tend to intersect the centerline 31. The entrance chine 24 reaches its maximum offset from centerline at the point 39 of maximum immersed sectional area. The length of the entrance (Le) 12 is about 60% of the length between perpendiculars (L) 48 (FIG. 1).

The run 13 is measured from the point of maximum immersed sectional area 39 to the last transverse station 11 at the transom 35 of the hull. There is no parallel midbody or length of the hull where the immersed cross-sectional area is constant. The run begins at the point 39 where the entrance ends. In versions of the invention, the line of the main deck may not be tangent to the chine at any point in the vessel's length indicating that the sides may flare out from the chine.

The various configurations of sterns are shown in FIG. 5 (A through E). The invention teaches that minimizing bow wave propagation is more significant than stern configuration, such that a comparative resistance coefficient, represented by curves 601 and 603 of FIG. 6, can be shown to be relatively flat regardless of stern influence, as shown by linear regression curves 602 and 604. The FIGS. 5A, 5B, 5C all display stern types which are constructed with immersed transoms. The FIGS. 5D and 5E display stern types which attempt to conform to non-transom like end points, specifically where the stern end point, station 10, is near the water line surface 5014, rather than immersed. All transom stern sections are shown with chine lines 5024, and those where the stern end point is above the water line are shown with a chine line 5025 and 5026 that extends to or above the water line 5014. Regardless of stern configuration, the invention improves overall hull performance by reducing wave making at the bow and along the hull up to the initiation of the run. Each station section represented by contour lines 6 through 10 or 12 through 20, are measured vertically from the base line 5002 and horizontally from the centerline 5001 of the body plans A through E shown in FIG. 5. Body plan 5E also shows fairing of the stern 5021 which may be required to merge with the lines of an existing engine room 5030, and the possible line of intersection 5026 that is the boundary between new and existing configurations.

Figure 6:
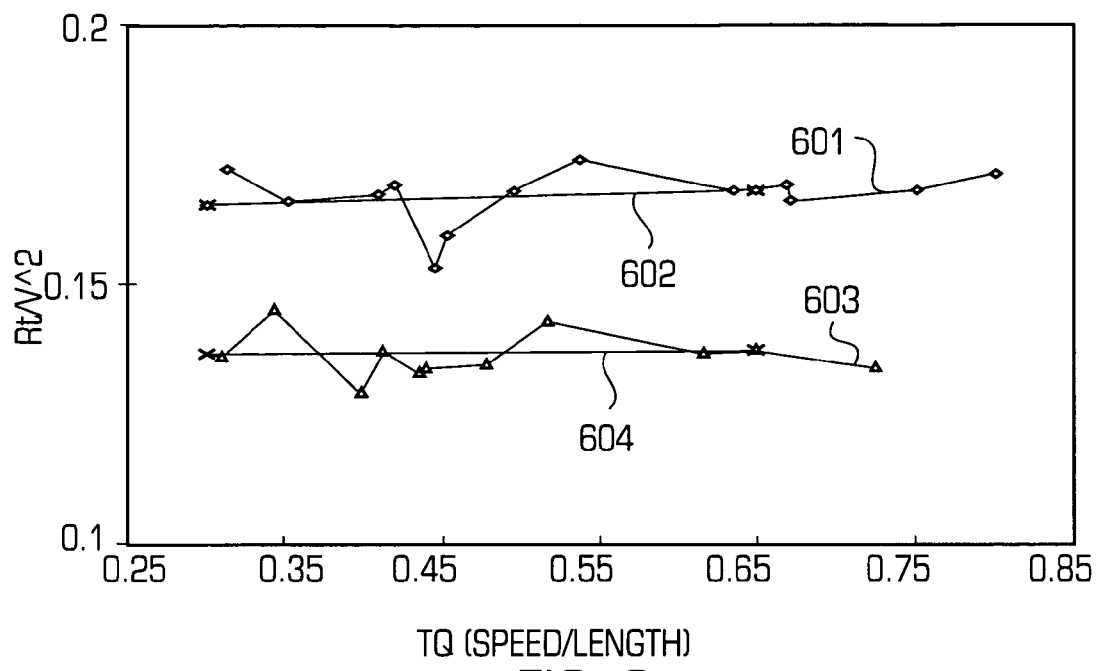
FIG. 6 is a chart illustrating the relative resistance coefficients (Rt/V^2 values) of various hull forms according to the present invention.

FIG. 6 shows charts that depict the test results of the invention with a transom stern 601 and a non-transom stern 603. The linear regression lines of the two test results, 602 and 604 respectively, show that wave making is relatively constant, meaning practically a function of speed only, rather than a function of stern drag contribution. It is the teaching of the invention that such wave making, within the speed ranges of a TQ of 0.20 to 0.90, is primarily a function of the bow form and can be optimized as defined by the invention.

Figure 7:
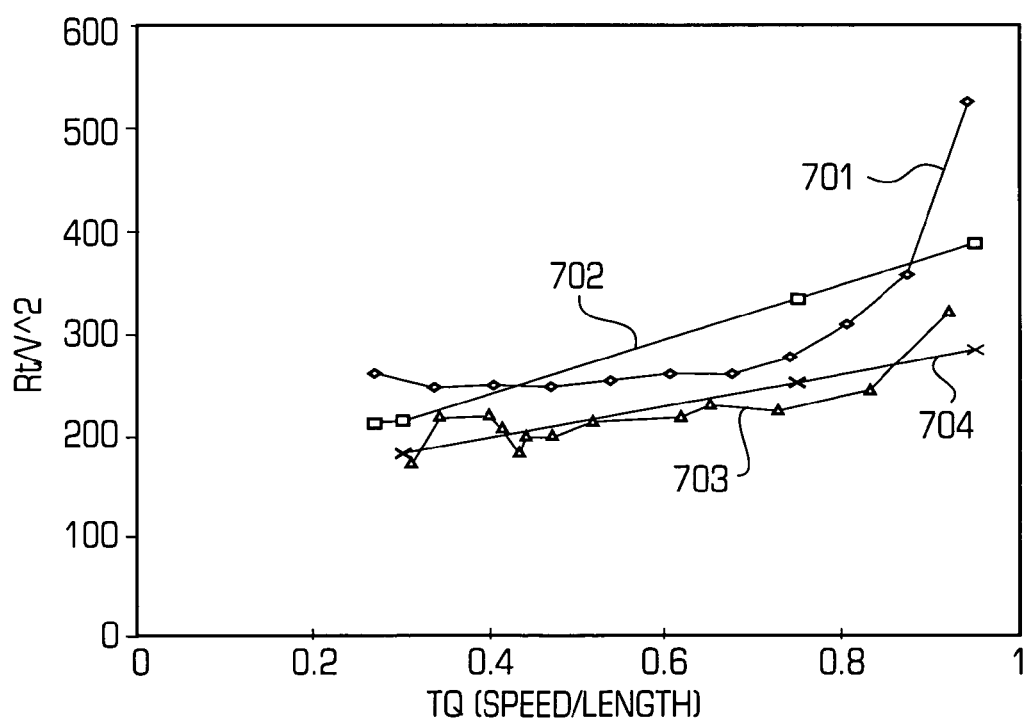
FIG. 7 is a chart illustrating the relative resistance coefficients (Rt/V^2 values) of conventional hull forms versus hull forms according to the present invention.

FIG. 7 is a chart that displays the test results of the invention with a stern shape similar to FIG. 5D (curve 703), compared to a tradition hull form defined by the Series 60 (curve 701). The linear regression line of the traditional hull form 702 may be compared with the line 704 of the invention. Comparing these two lines 702 and 704, it is evident that the invention develops significantly less wave making resistance than the conventional hull form, regardless of the stern configuration.

Figure 8:
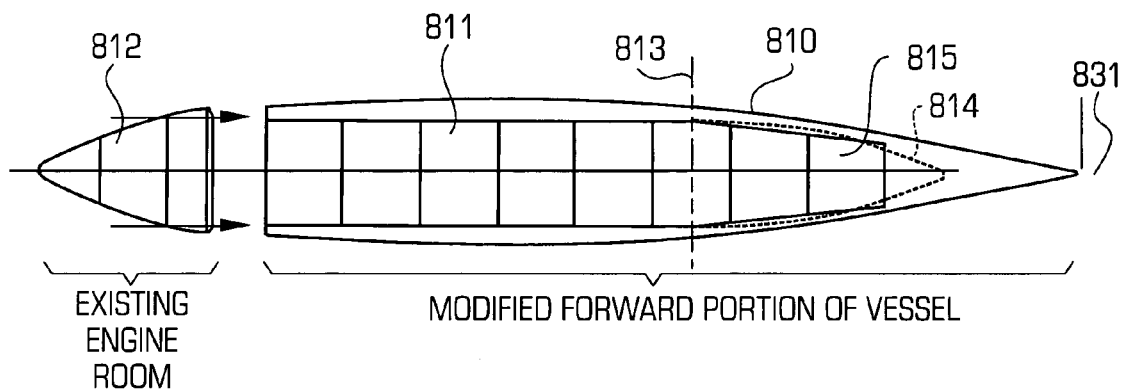
FIG. 8 is a diagram illustrating the joining of a generic stern configuration with the invention.

FIG. 8 is a schematic diagram illustrating one of the teachings of the present invention, specifically, that a conventional hull form 811 can be encased inside a hull form, which conforms to the invention 810. The forward cargo tanks 815 of the conventional hull 811 can be modified to fit the forward section of the invention 814. The two hulls may be aligned on a common centerline 831. The transition point 813 defines the tangent point between the two hulls where the closest point of approach is reached. In addition, a conventional stern configuration, consisting of an existing engine room 812 can be attached to the combined hulls without adversely affecting overall resistance, as taught in FIG. 7. The outer hull form 810, specifically the invention, can be referred to as a "sponson", meaning a hull addition other than the basic buoyant configuration requirements of the combined deadweight and light ship weight 811 and 812 of the conventional hull form.

Figure 9:
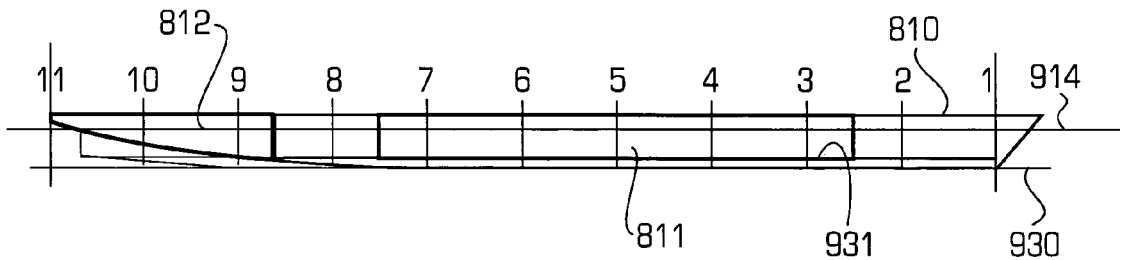
FIG. 9 is a diagram illustrating an outboard profile of the forward hull shape in accordance with the invention and the fairing of a generic stern to the hull.

FIG. 9 is a diagram which shows the relative position of the conventional hull form 811 and the existing engine room 812, housed within the invention 810, forming a sponson encasing the conventional hull form. The combination of the hull form 811 and the invention 810 floats at a water line 914. The combined hulls are located in reference to a base line 930, where the hull 811 is on a step 931 at or above the baseline 930, not below it.

Figure 10:
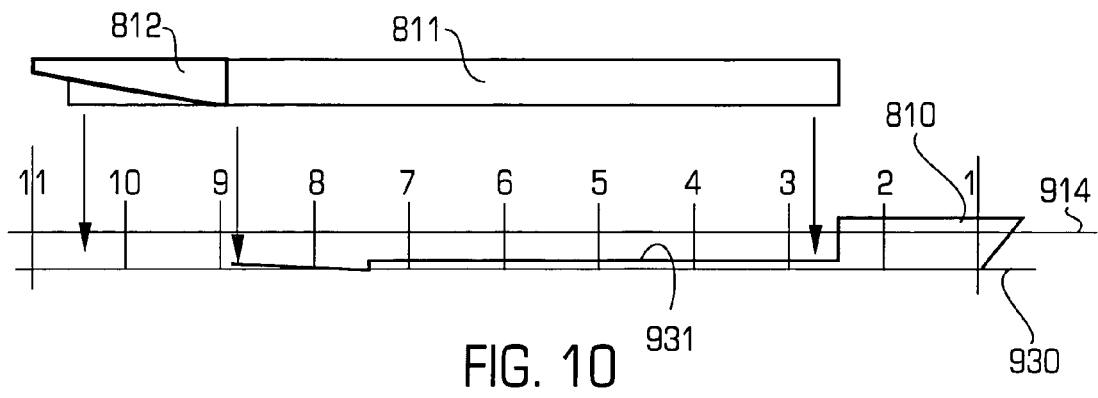
FIG. 10 is a diagram illustrating a center cut-away view of a traditional tanker hull fitting inside the outer hull shape of a large hull form of the invention.

FIG. 10 shows the invention 810 as an internal section cut along the centerline 831 (FIG. 8), where the invention is shown as a stepped cut-out that is prepared to receive the hull 811, and encase it. The base line 930 is shown below the step of the invention that receives the hull 811. The step 931, which forms the base of the support for the hull 811, can be zero to any distance above the base line 930. The purpose of the step, in designing the invention 810 to accommodate an existing hull 811 is to insure that the existing hull fits within the encasing sponson of the invention and to provide a boundary between the exterior hull, of the invention 810, to the interior skin of the existing hull 811. FIG. 10 also illustrates the addition of an engine room 812 which fits the after section of the invention 810. The engine room 812 may be an existing unit or constructed specifically for the application. The invention provides that the addition of an engine room does not detract from the minimizing wave making properties of the invention and may be any number of alternative conventional designs FIG. 5.

Figure 11:
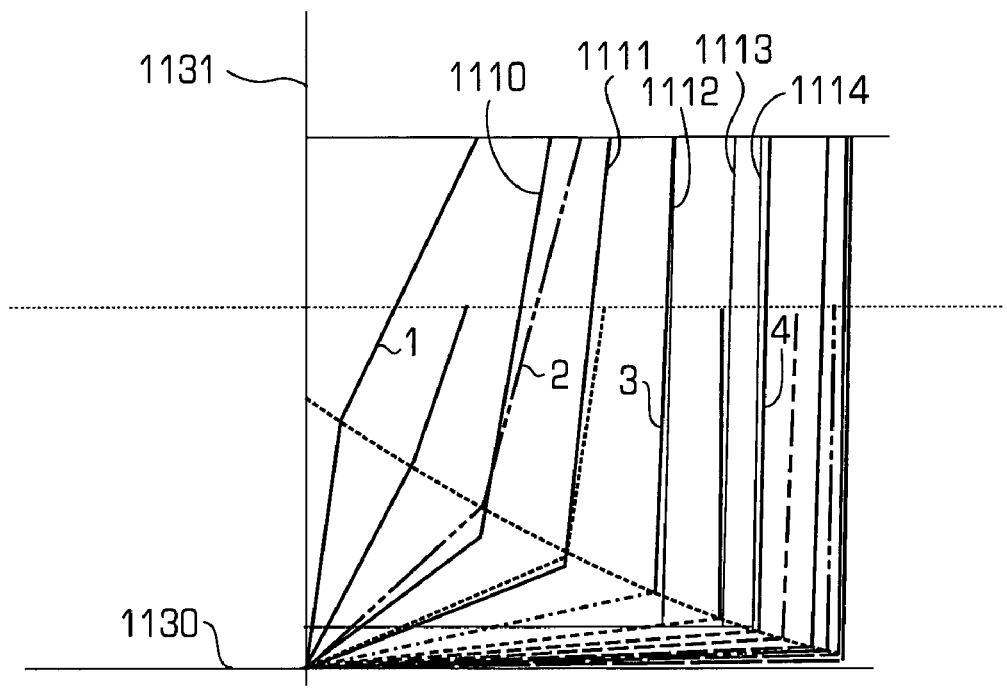
FIG. 11 is a diagram illustrating a transverse section of cargo tanks in forward stations of a bow.

FIG. 11 is an illustration of how the invention allows cargo spaces to be constructed as straight line side compartments, which fit inside the exterior hull form of the invention. The cargo compartments that exhibit the greatest variation in polyhedron shape are those that conform to the forward stations of the invention, between stations 2/1;2 and 4. These cargo compartment boundaries are drawn as outlines about a baseline 1130 and a center line 1131. For example, the outline of the cargo compartment 1110, which fits inside the station 2/1;2 of the invention, shows two knuckles. The outline of the cargo compartment 1111, which fits inside the station 3, shows two knuckles. After station 3 of the invention, the cargo compartments 1112–1114 become increasingly orthographic so that they form rectangular sections within the invention. This feature of rectangular cargo tanks encased within a hull form of differential variations in beam, which eliminates a parallel midbody, optimize both cargo compartment constriction and exterior hull form construction, since neither is bound to conform specifically to the other.

Figure 12:
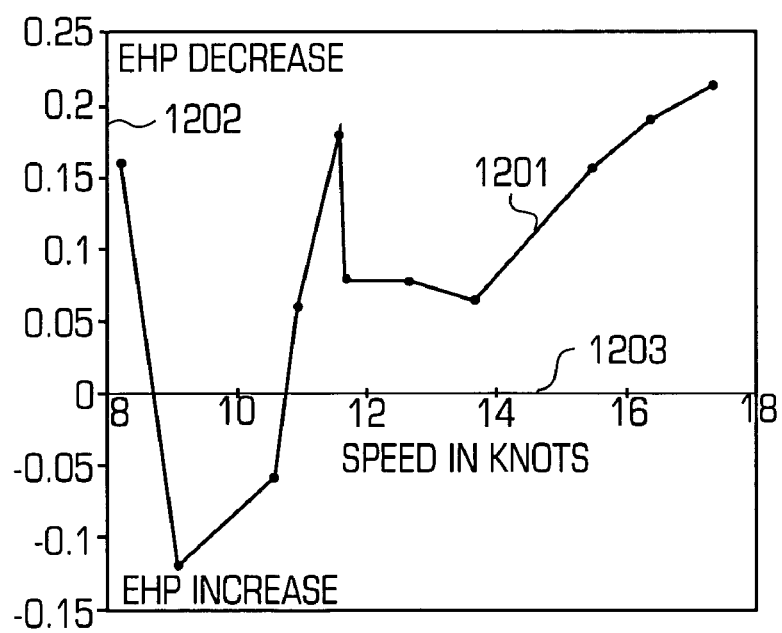
FIG. 12 is a chart illustrating the percent reduction in Effective Horse Power for the invention compared to a traditional hull form.

FIG. 12 displays a graph that shows the overall reduction in effective horsepower 1201 (EHP), as a percentage 1202, of the invention compared to a modern tanker hull form, as shown by curve 1201. The purpose of this graph is to delineate the advantage of the hull form of the invention compared to a modern hull form. It is seen from the graph that tested results comparing the two alternatives show that, at operational speeds 1203 in excess of 11 knots, the advantage of the invention is significant, reaching 20% advantage at speeds where wave making is most significant.

Figure 13:
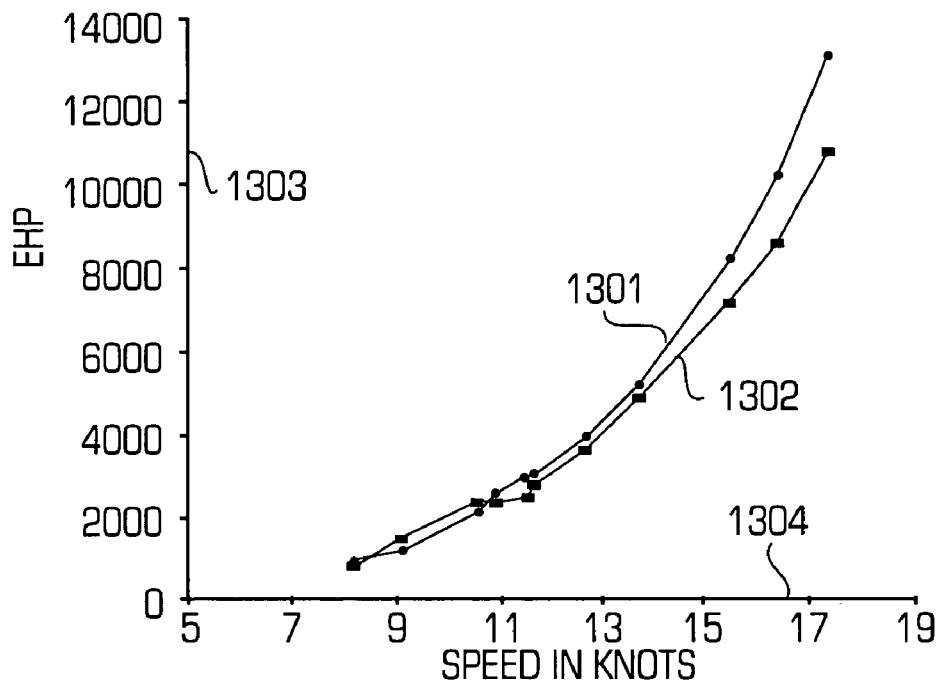
FIG. 13 is a chart illustrating the Speed plotted against Power requirements for the invention compared to a traditional hull form.

FIG. 13 is a graph that displays the advantage of the invention in terms of required horsepower 1303 to achieve a given speed (curve 1302) compared to a modem tanker hull (curve 1301) with the same cargo capacity, length and beam. This graph shows the full range of advantage in excess of 11 knots of the invention 1302 over conventional modern hull forms 1301. As speeds 1304 increase, the invention displays such significantly lower power requirements for propulsion, that modern designs, employing typically parallel midbodies and forms of bow configurations using "bulbs", that these current forms of hull configurations are challenged as economically viable designs.

Figure 14:
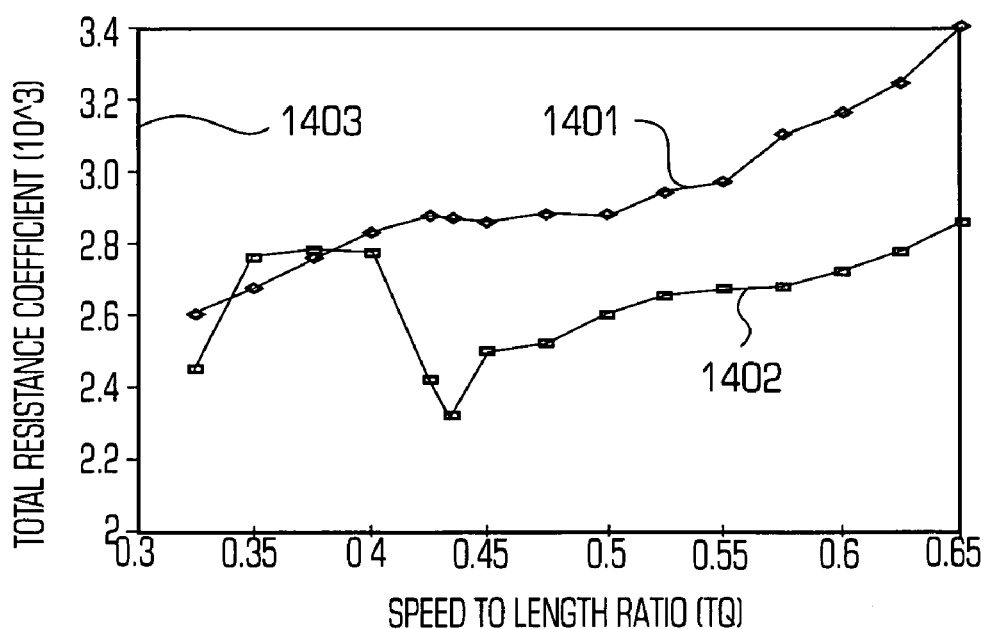
FIG. 14 is a chart illustrating the Comparative (Ct) or Total Resistance Coefficient of the invention compared to a traditional hull form.

FIG. 14 is another graph which compares tested results between a conventional modern hull design (curve 1401), which conforms to the properties of a Taylor Standard Series hull form, and the invention (curve 1402), defined in terms of a standard vessel length. This graphs compares the Total Resistance Coefficient 1403 (Ct) between the respective hull forms 1401 and 1402 over a range of speeds represented by the coefficient TQ 1404. These tests are irrespective of any interior hull encasement or cargo compartment design. These tests compare the exterior hull bodies of the two samples and serves to evaluate the advantage of the invention over conventional modern designs.

Figure 15:
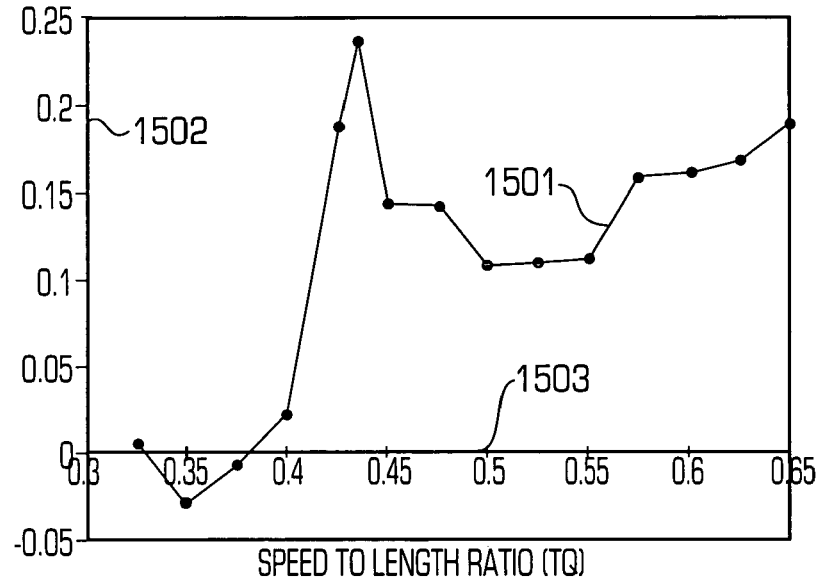
FIG. 15 is a chart illustrating the Percent reduction in Ct of the invention compared to a traditional hull form.

FIG. 15 is an extension of FIG. 14, in that the variations between the two samples, invention and modern hull design, so that the superior performance of the invention is represented as a percentage 1502 variation from the modern version of hull design. In this graph, curve 1501 shows that the invention, where vessel characteristics are reduced to the conventions of the Taylor Standard Series, exhibits an optimization of form where the TQ 1503 (square root of length ratio) exceeds 0.4. In the case of the Taylor Standard Series vessels, this TQ corresponds to a speed of 8 knots for a 400 ft vessel.

Figure 16:
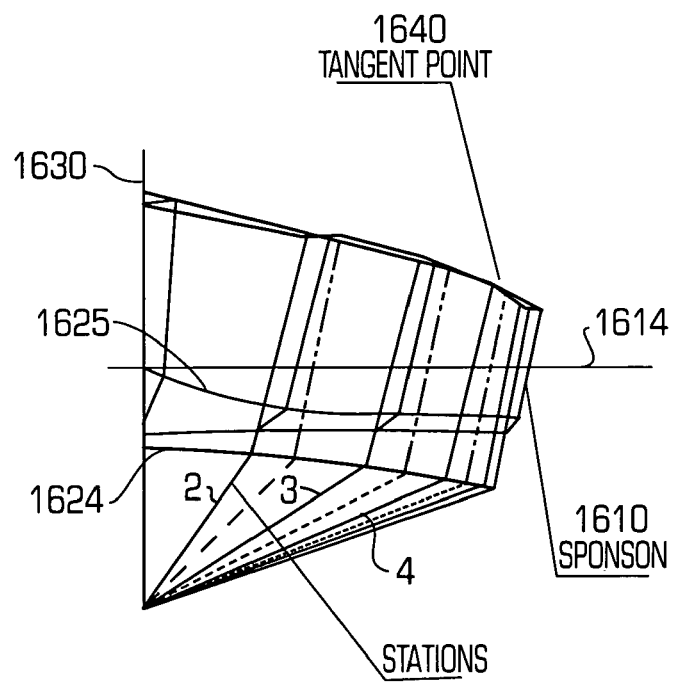
FIG. 16 is a diagram illustrating the use of sponsons at the waterline level of an existing hull.

FIG. 16 is a diagram which shows the addition of the invention 1610 to a hull form where the invention does not encase the existing form. The invention is designed so that it conforms to a tangent point 1640 on the existing hull, where this tangent point sets the reference of the development of the invention parameters about the existing hull. Stations 2, 3 and 4 of the existing hull, where an existing chine 1624 is below the operating waterline 1614, are fitted with additions to the beam called sponsons 1610. These additions are formed above the existing chine 1624, and are faired as a body with their own chine line 1625. The added sponson commences at the vessel's center line 1630, and wraps around the bow on both sides of the vessel (FIG. 16 only shows one-half the vessel.) The parameters of the invention are described in FIG. 2, FIG. 3, and the method of creating a sponson set conforming to an existing hull is shown here as a body plan and in FIG. 17 as waterline plan views.

Figure 17:
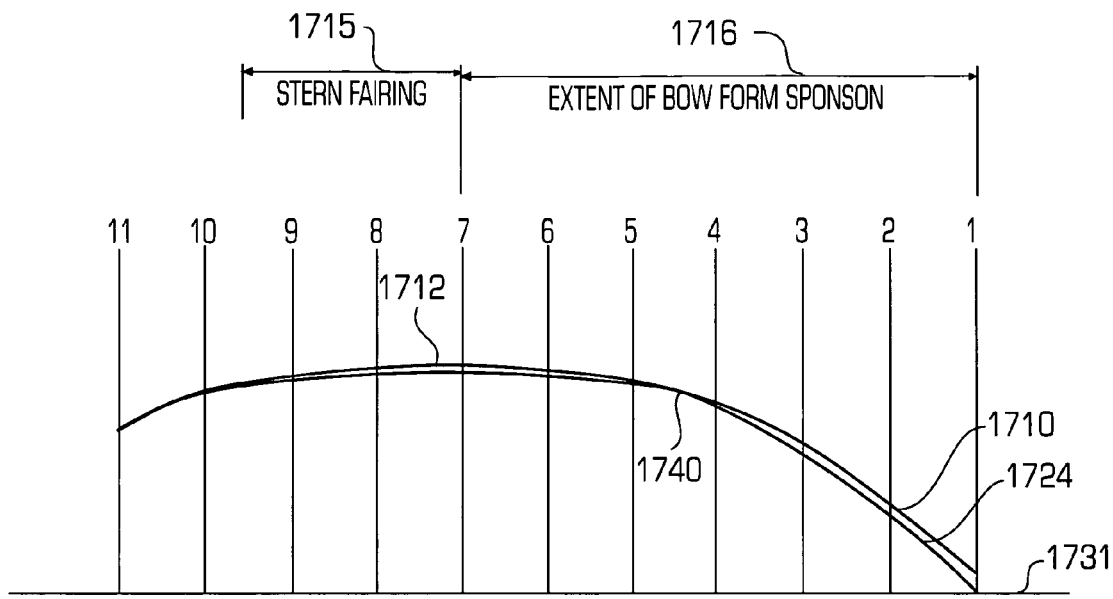
FIG. 17 is a schematic diagram illustrating the waterlines of an original hull shape in association with the hull shape modified by sponsons, according to the present invention.

FIG. 17 is a diagram which shows the waterline 1724 of a hull shape which has been modified by the invention 1710, and reflects the hull form shown in FIG. 16. The original waterline of the hull shape 1724 is modified by the addition of sponsons 1710 which alter the waterline profile 1716 and 1715 to conform to the specifications of the invention. The invention modifies the original hull form by establishing a point of tangency 1740 where the invention creates a reference point to the original hull form. The offset differences are measured from the centerline 1731 of the original vessel form. The invention modifies hull form from the forward station 1 to the station 7. This is the extent of the bow form sponson 1716. Aft of the station 7, the stern sponson is faired 1712 to conform to the existing waterline shape, and this fairing extends over a distance 1715 required for a smooth transition.

Figure 18:
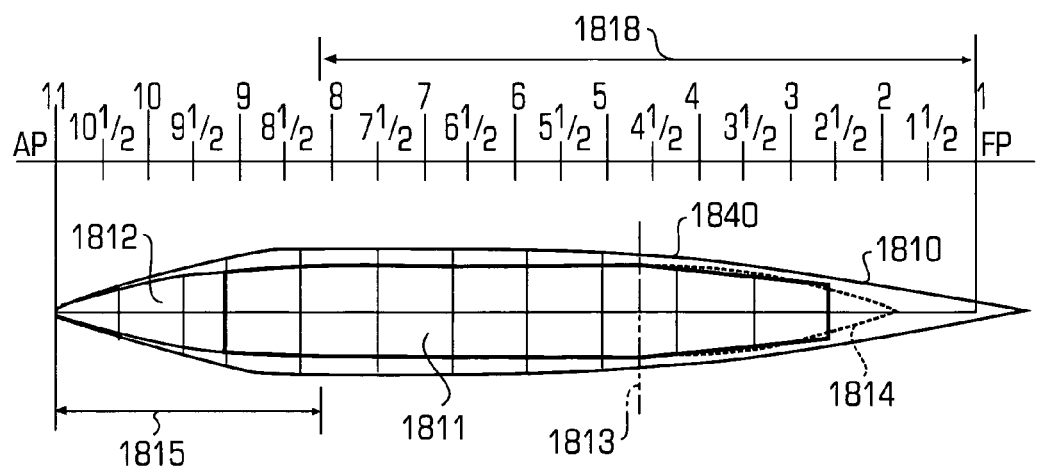
FIG. 18 is a schematic diagram illustrating the waterline view of an outer hull formed around a traditional tanker hull, according to the present invention.

FIG. 18 displays a schematic arrangement, representing the load waterline view 1810, of a vessel created by inserting a traditional hull 1811 (or any type of hull) into the envelope of the invention 1818. The specific reference shows the arrangement of cargo tanks 1811, from the existing vessel, maintaining their original configuration and fitting inside the water line envelop 1810 of the invention. The point of tangency 1813 is established so that the existing form of the cargo tanks can be modified to conform to the bow shape of the invention 1840. The stern configuration of the vessel 1815, modified according to the invention, is determined by the fairing required to merge the existing engine room 1812 to the stern fairing curve of the inventions. The stern form may contain an engine room. This engine room may be part of the original cargo vessel, and used as the engine room of the new vessel modified by the invention. In this way the expenses of building and outfitting a new engine room can be avoided, thus making an important saving in expenses.

FIG. 19 shows the profile of a hull representing the invention. This figure shows the length between perpendiculars 48 and other basic reference points of measurement for the stations 1 through 11 and the slope of the keel forward 19 and the slope of the keel aft 21. Station 1 is located at the intersection of the bow stern 36 to the slope of the bow keel 19. Each station from station 1 is measured in equal parts so that the station spacing is 1/10th the distance from station 1 to station 11. The stern is raked forward so that waterlines 15 through 18 form concave contours between stations 1 through 4. The bow keel line 19 is sloped up from the baseline 30 so that waterlines 15 through 18 form concave contours between stations 1 through 4. The length of the bow keel slope 20 is about 0.1 L, a ratio of the length from station 1 to 11. The elevation of the bow slope 37 is not greater than about 0.067 radians. The aft keel 21 slopes up and aft at about 0.69 L 48 from station 1 and extending to the transom 35 (and station 11). The keel begins to slope up and aft a specific distance (about 0.31 L) 22 from the stern 35. The elevation of the stern rise 38 is not greater than about 0.027 radians. Stern rise is determined by a direct calculation which involves draft, chine height and sectional area as coefficients. The chine 24 begins high on the bow 36 and gradually slopes down to a point at station 7 where it runs to the stern 35 as a straight line parallel with the base line 30. The line of the keel follows a specific shape which is a result of hollow waterlines forward and fill convex waterlines aft. The forward keel line, at the bow, rakes up towards the stern allowing immersed bow section areas to be thin and forward waterlines to be hollow. The after keel line slopes up from the midbody towards the stern. This allows the immersed stern section areas to decrease and to maintain convex waterlines as they close aft at the transom.

Figure 20:
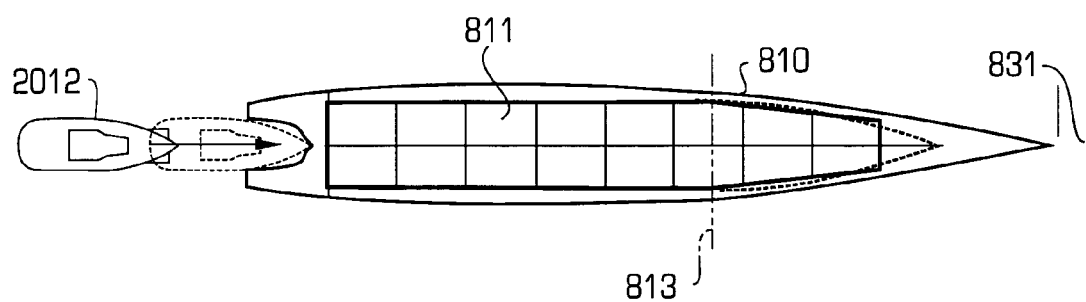
FIG. 20 is a schematic diagram illustrating how a tugboat can be combined with a hull formed according to the present invention to create a barge.

FIG. 20 displays the method which the invention can be used to develop a completely separate hull form 810, comprising the characteristics of the invention, namely the bow form, in combination with a nondescript stein form 2012. The value of the invention is its ability to conform to any stern configuration, however random, and possibly characterized by a tugboat hull 2012. Cargo compartments 811 can be largely rectangular, with trapezoidal shapes forward of a tangent point 813. The outer hull and inner cargo compartments are constructed about a common center line 831. The fundamental proposal of the invention states that the wave drag resistance created by the hull form over 60% of the vessel length, measure from station 1 to station 7, can be minimized by a specific configuration of bow and midbody offsets 810 that describe a minimal wave drag effect. This wave drag effect can be shown to be independent of any stern influence. This influence can be any number of pushing forces, including but not limited to pusher tugs. The invention teaches that stern forces, such as propulsion wake energies or normal hull closing wakes, can be considered discrete from bow wave drag in terms of hull performance. Thus, the bow configuration can be optimized without consideration of the aft hull profile. Although experimental model basin testing has established that stern configuration can also contribute to optimizing the hull form in general, regarding resistance through the water, a specific propulsion arrangement may be desired for other reasons not associated with resistance. FIG. 20 represents the option of using a tugboat to provide power to a hull form that is otherwise optimized by the invention.

FIG. 21 portrays one embodiment of the characteristic bow form of the invention, with natural highlights, in a three-dimensional perspective. FIG. 21 shows the hollow or concave 2101 waterlines that are formed from the stern 36 and below the chine 24. These forward waterlines converge at the stern 36 and centerline 31. FIG. 21 is a view of the hull from below looking up. The location of transverse sections 1 and 2 are shown. The general contour of the waterlines below the chine are implied by the characteristic shape of the forward hull between sections 1 and 2 adverse side of the perspective 2102 and by the natural highlights of the concavity on the converse side of the perspective 2103. The characteristic shape of the bow is further shown by the rise of the keel forward 19 from station 2 to 1 creating the very narrow centerline 31 profile which is conducive to the concave waterline contours in the bow. The line of the main deck 32 is shown in perspective to the chine 24 for the forward sections. Station 1 is located at the intersection of the bow stern 36 to the slope of the bow keel 19.

The immersed sections of a hull form, which corresponds to the preferred embodiment of the invention, may be determined, using the immersed sectional area distribution 40 (FIG. 3), by applying specific formulae to predetermined variables. The predetermined variables are a result of decisions made by the hull designer and include length (L), maximum beam at the waterline (B), desired draft (H), load displacement and block coefficient (Cb). The prismatic coefficient (Cp) of the preferred embodiment of the invention is about 0.735. Other prismatic coefficients may be chosen.

The block coefficient Cb is determined by dividing the displaced volume of the hull by the block cubic volume of the chosen hull dimensions:

$$Cb = (\text{actual Volume})/(L \times B \times H)$$

Where the actual volume, for salt water, is the chosen load displacement (in long tons, i.e., 2240 lbs) times 35.18 cu. ft. per ton.

The midships area coefficient, Cx, is determined, where:

$$Cx = Cb/Cp$$

The maximum immersed cross sectional area, Ax, at station 7 is determined as:

$$Ax = Cx(H)(B) = A7$$

Each immersed sectional area for each station 1 through 11 is then determined by referencing FIG. 3 and obtaining the sectional area ratio (An/Ax) for each section (An) where n=1 to 11.

For the Dimensions of the Bow Stations 1 to 6

The height, K1, of the keel above the base line at station 1 is:

$$K1=(0.061)(0.1\ L)$$

In the preferred embodiment of the invention for the bow entrance, the height of the chine at station 1 may be either below or above the design draft 25 of the vessel. In FIG. 4, the chine at station 1 is shown below the design draft. This is a common feature when the block coefficient of the vessel Cb is greater than about 0.60. When this occurs, the bow section at station 1 becomes fuller so that the beam Bd1 of station 1 at the design draft (H) 14 (FIG. 4) is broader then a simple triangle.

The chine location at station 1 must be determined in the initial design steps of the invention, and this is done by first determining the location of the chine at station 2.

In the preferred embodiment of the invention, if the relationship of $$[2HB-(1.395)Ax]/B \text{ is larger than the design draft } H,$$

then the chine at station 2 is above the design draft 14 (FIG. 4), of the vessel so that the immersed bow section of station 2 is a simple triangle and the beam Bd2 of station 2 at the design draft (H) is $$Bd2=[(0.5414)(Ax)]/H$$

Else the chine at station 2 is below the design draft H and the average of the beam at the immersed chine and the beam at the load waterline is (B2) and is calculated as $$B2=(0.388)(B);$$

and the chine height at station 2 is $$C2=2[H(B2)-(0.2707)Ax]/B2$$

From this information about station 2, the height of the chine at station 1 is derived, so that if the relationship $$C2(1.522) \text{ is less than the design draft } H$$

then the chine at station 1 is below the design draft and the beam Bd1 of station 1 at the design draft is $$Bd1=(0.1336)Ax/(H-K1)$$

The chine height at station 1 is $$C1=1.522(C2)$$

and the average of the immersed chine and the beam at the load waterline at station 1 is $$B1=B2-(0.264)B$$

Else the chine at station 1 is above the load waterline and the beam at the load waterline (Bd1) is $$Bd1=[(0.0668)(Ax)]/(H-K1)$$

The corresponding average of the beam at the immersed chine and the beam at the load waterline is designated as (Bn). At stations 2 through 7 (Bn) is calculated as:

$$B2=(0.388)(B) \text{ if the relationship } [2HB-(1.395)Ax]/B \text{ is less than } H$$

$$B3=(0.664)(B)$$

$$B4=(0.838)(B)$$

$$B5=(0.936)(B)$$

$$B6=(0.976)(B)$$

For the corresponding average of the beam at the immersed chine and the beam at the load waterline at station 7

$$B7=(0.993)(B)$$

The immersed sectional area, An, at each station where n=1 through 7, for full displacement hulls achieving low and medium speeds below a TQ of 1.2, is:

$$A1=(0.0334)Ax$$

$$A2=(0.2707)Ax$$

$$A3=(0.5735)Ax$$

$$A4=(0.7903)Ax$$

$$A5=(0.922)Ax$$

$$A6=(0.982)Ax$$

$$A7=Ax$$

The height of the immersed chine, Cn, at each station n=2 through 6 is $$Cn=2[H(Bn)-An]/Bn$$

C2 is only calculated if the chine at station 2 is immersed.

For the Dimensions of the After Station 7

The average beam, B7, at station 7 is calculated as:

$$B7=(0.993)(B)$$

The height of the chine, C7, at station 7 is determined as:

$$C7=2[H(B7)-Ax]/(B7)$$

It should be appreciated that all of the foregoing equations along with all equations contained herein include and provide precise values according to one embodiment, but that approximate and/or less precise values may be used in accordance with the present invention. For example, the values contained in and provided by these equations may vary in the range of at least 5% without a substantial effect on performance.

Stern sections, from station 8 to 11, which comprise the run, can be construed from any standard set of curves and are not specifically related to the effort to spread the water around the hull. FIGS. 5A–E illustrate some examples of stern sections that may be implemented in a hull according to the present invention.

The points developed by the formulas given above may require slight adjustments to satisfy the requirements of a "fair" set of lines which describe the hull shape of the invention.

Hull resistance 703 of the invention can be shown to have significantly less wave-making drag compared to published test results of conventional hulls 701 throughout the operational speeds of the invention, as shown in FIG. 7. Using non-dimensional coefficients, the resistance coefficient of the hull (total resistance divided by displacement or Rt/Displ) can be plotted against the speed coefficient TQ (vessel speed in knots divided by square root of vessel length or Taylor Quotient). The hull form operates both as a planing hull and a displacement hull where wave-making is significant. Operating at speeds where planing is the dominant hull behavior, the wave-making becomes minimal and the hull resistance is principally a function of dynamic lift on the bottom surface of the hull. These planing speeds are reached at a TQ above 2.5. At speeds below a TQ of 2.5 a combination of planing and wave-making takes place. The wave-making resistance can be so great as to form a "hump" right at the mid-range of hull speed before the hull reaches its planing speed. This resistance hump can be large enough to require extra propulsive power just to overcome the mid-range resistance, power which is not required in the planing speeds.

It should be appreciated that the foregoing bow and stern offsets can be treated as discrete. Even though a vessel's overall efficiency depends upon the combined effects of bow and stern, they are not dependent upon each other to create separation and closing effects. Therefore, the present invention may be used to design or modify an improved hull that implements either the bow or stern offset design taught herein, or that implements both the bow and stern offset designs.

Minimal wave-making characteristics are based upon foregoing hull form, where the length of the hull is the Length described above. The hull has a hard chine, straight frame sections from centerline to the chine, and a length of entrance that is approximately 60% of the vessel length. The block coefficient of the hull form is about 0.80 or less.

The foregoing teachings explain that a hull form, defined by coefficients from bow to stern, can be designed to lower wave resistance and achieve high speed during planing. However, model testing of the entrance offset coefficients of the invention in lower speed displacement type hulls in combination with different run offsets demonstrates that low wave-making characteristics of the entrance remain substantially uniform even though the overall resistance varies for vessels which do not operate in the semi-displacement or planing speed ranges.

The shape of the bow, represented by bow offsets, which comprise the vessel's entrance, tends to reduce the force needed to spread the water around the bow, and ultimately the hull of the ship. This spreading effort can be represented in the second order of differences between stations FIG. 2, as defined by Guilliton. For the initial station 1, the second order difference is expressed as $$\text{Delta2}_1 = Bd_2 - Bd_1$$

Where the designation $Bd_n$ signifies the beam of station (n) at the load waterline. For stations from 2 through 7, the relationship is expressed as $$\text{Delta2}_n = Bd_{n+1} - 2Bd_n + Bd_{n-1}$$

where the subscript (n) denotes the station number and Delta2 denotes the difference between the first offset differences of the stations adjacent to station n. Vessel length is divided into 10ths so that there are 1 stations, from stern to stern. This is a total of 11 sections from bow to stern. Stations 1 through 7 represent the bow entrance.

When the chine at station 1 is above the load waterline H, as characterized by a vessel with a block coefficient below about 0.60, then the second order of differences between waterline station offsets, which define an optimized bow form according to the invention, can be represented in terms of the difference as a fraction of the maximum waterline beam (B), so that for a fine vessel form:

$$\text{Delta2}_1 = 0.3329(B)$$

$$\text{Delta2}_2 = -0.0536(B)$$

$$\text{Delta2}_3 = -0.1079(B)$$

$$\text{Delta2}_4 = -0.0795(B)$$

$$\text{Delta2}_5 = -0.0415(B)$$

$$\text{Delta2}_6 = -0.0305(B)$$

$$\text{Delta2}_7 = -0.0555(B)$$

When the chine at station 1 is below the load waterline H, as characterized by a vessel with a block coefficient of about 0.60 and above, then the second order of differences between waterline station offsets which define an optimized bow form with a fuller form according to the invention, can be represented in terms of the difference as a fraction of the maximum waterline beam (B), so that for a full vessel form:

$$\text{Delta2}_1 = 0.255(B)$$

$$\text{Delta2}_2 = -0.00415(B)$$

$$\text{Delta2}_3 = -0.07676(B)$$

$$\text{Delta2}_4 = -0.06846(B)$$

$$\text{Delta2}_5 = -0.06224(B)$$

$$\text{Delta2}_6 = -0.02282(B)$$

$$\text{Delta2}_7 = -0.06432(B)$$

Using these offset differences, actual waterline beam can be determined at the bow stations 1 through 7 of 11 stations from bow to stern according to the invention, as follows:

$Bd_2 = Bd_2$ (as determined from previously defined relationships)

$$Bd_1 = Bd_2 - \text{Delta2}_1$$

$$Bd_n = [Bd_{n+1} - \text{Delta2}_n + Bd_{n-1}]/2$$

$$Bd_{n+1} = 2Bd_n + \text{Delta2}_n - Bd_{n-1}$$

$$Bd_{n-1} = 2Bd_n + \text{Delta2}_n - Bd_{n+1}$$

It should be appreciated that all of the foregoing equations include and provide precise values according to one embodiment, but that approximate and/or less precise values may be used in accordance with the present invention. For example, each of these offsets may be refined by developing a fair line, specifically a mechanical curve determined by a spline, between the sequence of points defined by the invention. The resulting fair line may vary slightly from the specific values provided by the equations contained herein. In developing a faired spline line between the offset points of the stations' beam, a procedure of cross checking is specified by the invention. This involves determining whether the chosen vessel dimensions require a fine bow form with the chine at station I above the load waterline or a full bow form with the chine at station 1 below the load waterline. With this determination, the appropriate Delta2 values are used detailing fine or full waterline beam as follows. Using the derivative formulas for $Bd_n$ calculate the waterline breadth from station 1 to 7. Determine the difference (Bdx) between the waterline breadth at station 7 and the design beam (B), where $Bdx = B - Bd_7$. Correct the waterline breadth at stations 7 to 2 to reflect the same difference (Bdx) between station breadths.

$$Bdn \text{ revised} = Bdn + Bdx$$

Correct the waterline breadth at station 1 using the Delta2 value.

$$Bd_1 \text{ revised} = (Bd_2 + Bdx) - \text{Delta}2_1$$

For full vessel forms, the waterline length may extend slightly beyond the length between perpendiculars (L) by the distance:

$$\text{Delta}(L) = Bd_1(0.1\ L)/(Bd_2 - Bd_1)$$

And the length on the waterline (LWL)=Delta(L)+(L)

Stern sections, which comprise the run, can be construed from any standard set of curves and are not specifically related to the effort to spread the water around the hull. FIGS. 5A–E illustrate some examples of stern sections that may be implemented in a hull according to the present invention. The stern effort consists of closing the water about the hull, utilizing the potential energy in the displacement of the fluid as it spreads to conform to the void left in the fluid as the hull form passes through. Stern sections, which may be standard or developed from a special set of parameters, may require fairing to the entrance 12 to conform to the stern, so as to modify the actual values as detailed by the invention at section 7. Then these values of maximum cross sectional area and maximum beam may be slightly displaced from the actual location of section 7, based upon 11 sections from the bow to the stern along the length 48 of the vessel.

It is demonstrated by the invention that the minimizing wave making bow form can be combined with the stern of a standard configuration, Such as that shown in FIG. 5D, and will improve the overall performance of the hull combination (see FIGS. 12 to 15).

The invention demonstrates that a hull design where the bow and entrance conform to the coefficients of the invention, and the stern housing the engine room, can be specifically designed to accommodate machinery arrangements without affecting bow wave making. Many variations in stern form exist, due to propeller arrangements, skegs and machinery placements. These variations can be faired to match the bow and entrance configuration of the invention.

The hull form is developed from the forms based upon form coefficients chosen by the designer. This involves the parameters of beam and area functions described for Bn/B and An/Ax coefficients for stations 1 through 7, based upon 11 stations, and Delta2n coefficients for stations 1 through 7, based upon 11 stations (FIG. 2). The hull form derived from these values embodies wave making properties, when reduced to a specific value that measures rate of increase of total resistance to rate of speed increase (Rt/V^2), are shown to compare linearly, FIGS. 6 and 7, meaning that the rate of change of the Rt/V^2 curve plotted against TQ is very small. This demonstrates that wave making for the invention is significantly a function of speed, with little or no second order effects of turbulence and form interference, such as is common in traditional designs. A linear regression from test results using least squares fit for the resistance coefficient, normally associated with wave making, is plotted against TQ (speed) coefficients. The slope function for the resistance over a TQ (speed) range of 0.3 to 0.95 shows the Series 60 hull 701 (FIG. 7) and traditional tanker 1301 (FIG. 13) develop greater wave making resistance for speed increases than the invention.

Alteration of the fundamental shape of the stern, while retaining the form of the bow, extending from station 1 to 7 (of 11 stations) from stern to stern, demonstrates the relative coefficient of resistance (Rt/V^2) is compatible between sample stern alterations.

The invention teaches that other forms of stern configurations can be used to advantage with the bow form of the patent. This includes combinations of pusher tugs (FIG. 20) joined to the stern of a barge hull where the barge shape is determined by the invention. These combinations are referred to as articulated tug/barge, and are especially adaptable to the proposal of the invention where stern configuration, essentially the pusher tug boat hull, does not detract from the low resistance benefits of the barge hull which in this case becomes the entrance/bow of the combination.

Any hull shape where effectively flat hull sides are an advantage can benefit from the bow form of the invention. This includes tankers and container ships. Container ships benefit because of the configuration of the cargo, which comprises generally rectangular box like shapes. Tankers can benefit from the design in the same way as container ships because the cargo tanks can be constructed as simple box or trapezoid shapes FIG. 11.

The invention allows a forward portion of a vessel to be modified and fitted to an existing engine room to improve the overall efficiency of the existing vessel. Bow sections can be modified by sponsons to create the correct ratios of Bn/B or Delta2n as specified in this invention.

The simplest use of the invention as a retrofitted modification is to add beam to the side of an existing vessel in the form of appendages which add volume as well as breadth to the waterline beam. Such a case uses sponsons where the appendage does not extend to the base line, and the sponsons are only added in a local area such as the waterline. The configuration of the sponson beam would conform to the Delta2 values (FIG. 2) represented in the invention. The sponson would conform to the arrangement shown in FIG. 16, which shows body plan sections of an existing hull with the sponson added to increase beam so that the DELTA2$n$ conforms to the invention.

The method of creating this type of sponson addition involves the selection of a point of tangency (FIG. 17) where the configured curve Bn/B of the invention contacts the existing load waterline at any distance between zero (0) to a distance determined by the designer. The waterline of the sponson is then determined by the DELTA2$n$ coefficients of the invention. The position of station 1 in FIG. 19 according to the invention is the intersection of the stern with the baseline. Using the invention to configure the waterline plan, the DELTA2$n$ basis for the offsets uses ¹⁄₁₀ths divisions of the waterline length so that there are 11 stations, from stern to stern. It must be stipulated that the addition of a sponson, using this invention, reduces the form coefficients Cp and Cb.

The applicability of retrofitted modifications includes single shell vessels which require double shell hulls, vessels which are substandard in their performance, vessels which require a beam increase or double bottoms to accommodate operational requirements without sacrificing speed and any other vessel which can benefit from increased performance.

The performance of the retrofitted hull retrofitted with the larger beam, using the invention, involves the existing horsepower of the attached engine room producing the same design speed of the old hull form, prior to retrofit.

In the case of an existing hull, such as a tanker, where it is desired to create a void space between the existing cargo tanks and the exterior skin, a new vessel form can be constructed using the coefficients of the invention, describing the bow or entrance, to create an outer hull "envelop"

into which the existing vessel tank forms can be inserted FIGS. 10 and 18. This utilizes the advantage of the minimal wave making properties of the invention so that a virtually new vessel with increased beam can be created with low resistance/powering requirements and low new construction costs, since the original vessel tank forms and engine room can be re-used, and without increased high resistance values typical of prototypes with increased beams.

According to the invention, the area distribution of the bow "envelop" is broad at the station 7 of 11 stations. This allows a stern configuration which tapers from broad to narrow to be joined to the envelop so that sectional slope of the envelop can be faired to a variety of stern sections, without affecting bow wave making (FIG. 18).

The overall area distribution for a retrofitted hull and existing engine room as a practical matter conforms to a reduced block coefficient (Cb) in order to match the retrofitted hull speed with the old hull speed. This means that the old engine room/stern shape (which was from a higher block vessel) is now joined to a finer block hull form. Conventional low Cb hull forms have a pronounced taper in the after sections which is not conducive to joining larger block stern sections. Because of the area distribution of the envelop (developed as a result of lower wave making) high block stern sections are easily joined to the envelop of the invention.

Specific advantages are realized using the concept of the invention when creating a retrofit to an existing hull. The transverse frames of the invention whether used as sponsons or outer hull form, creating an envelope, are straight. The basic bilge transition is a hard chine. The external hull configuration (straight frame sides and hard chine) is conducive to existing hull fitting within the new hull envelope. External hull configuration is conducive to simple internal tank configurations (FIGS. 10 and 11).

There is a minimum of bow plate curvature for the entrance (stations 1 to 7) compared to vessels with parallel midbodies, since the rate of curvature over the 0.6 L of the entrance is less than the combined curvature of the traditional bow with the midbody knuckle.

There is a box like cargo tank configuration, requiring minimal shape factors. This produces 80% of cargo tank volume in the shape of square or rectangular sections.

The purpose of applying the invention to existing vessels, involving sponsons of limited dimension to those which envelop the existing hull, is to improve the performance of the existing hull, the cargo capacity, the configuration of the hull with certain design standards, as well as to reduce retrofitted costs for engine room, cargo tanks and cargo systems. Economic advantages can be realized using the invention to reduce hull construction, engine room attachment, and the maintenance of prior levels of service speed with the same horsepower of the existing plant, while operating at an increased displacement. Sponsons can be used to create the waterline offsets. This concept allows a forward portion of a vessel to be fitted to an existing engine room, or to improve the overall efficiency of the existing vessel. Bow sections can be modified by sponsons to create the correct ratios of Bn/B as specified in this invention.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A vessel comprising:
a hull having a forebody extending about 0.6 times a waterline length of the vessel from a stem and an afterbody extending thereafter to a stern, wherein the hull is characterized by an immersed sectional area distribution providing a volume with concave surfaces in the forebody, a stem that is raked forward so that waterlines from the stem to about 0.4 of the distance from the stem to the stern to form concave contours, and a bow keel that extends about one tenth of the waterline length of the vessel and has a slope no greater than about 0.067 radians.

2. The vessel of claim 1 wherein the immersed sectional area distribution further provides a volume with convex surfaces in the afterbody.

3. The vessel of claim 1 wherein the hull comprises an original hull with appendages that modify a shape of the original hull.

4. The vessel of claim 3 wherein the appendages are sponsons.

5. The vessel of claim 2 wherein the hull further includes a transom and an aft keel that slopes up and aft at about 0.69 of the distance from the stem to the stern and extends to the transom.

6. The vessel of claim 5 wherein the stern has a rise of less than about 0.027 radians.

7. The vessel of claim 1 wherein the hull is a full displacement hull for use in a mode where wave-making characteristics are present.

8. A vessel comprising:
a hull having forebody extending from a stem and an afterbody extending thereafter to a stern, wherein the hull is characterized by an immersed sectional area distribution providing a volume with concave surfaces in the forebody, and wherein the average of the beam at the immersed chine and the beam at the load waterline is substantially given as follows:

$B2 = (0.39)(B)$ if $[2HB-(1.40)Ax]/B$ is less than $H$;

$B3 = (0.66)(B)$;

$B4 = (0.84)(B)$;

$B5 = (0.94)(B)$; and $B6 = (0.98)(B)$;

where Bn is the average at tenths of the waterline length along the waterline, B is a maximum beam at the load waterline, H is a design draft of the vessel, and Ax is a maximum immersed cross sectional area.

9. The vessel of claim 8 wherein the immersed sectional area distribution further provides a volume with convex surfaces in the afterbody.

10. The vessel of claim 8 wherein the hull comprises an original hull with appendages that modify a shape of the original hull.

11. The vessel of claim 10 wherein the appendages are sponsons.

12. The vessel of claim 8 wherein the hull is a full displacement hull for use in a mode where wave-making characteristics are present.

13. A vessel comprising:
a hull having a forebody, wherein the hull is characterized by an immersed sectional area distribution providing a volume with concave surfaces in the forebody, wherein the first station has an immersed bow section that is a simple triangle, and a beam that is substantially given as follows:

$$Bd1=[(0.067)(Ax)]/(H-K1),$$

where H is the design draft, Bd1 is the beam of the first station at the design draft, Ax is a maximum immersed cross sectional area, and K1 is the height of a keel above a base line at the first station.

14. The vessel of claim 13 wherein the immersed sectional area distribution further provides a volume with convex surfaces in the afterbody.

15. The vessel of claim 13 wherein the hull is a full displacement hull for use in a mode where wave-making characteristics are present.

16. A vessel comprising:
a hull having a forebody and an afterbody;
wherein the hull is characterized by an immersed sectional area distribution providing a volume with concave surfaces in the forebody, wherein:

$$[2HB-(1.40)Ax]/B>H,$$

where H is a design draft of the hull, B is a maximum beam of the hull, and Ax is a maximum immersed cross sectional area of the hull; and
wherein the hull has a first station with an immersed bow section that is a simple triangle, and a second station with a beam that is substantially given as follows:

$$Bd2=[(0.54)(Ax)]/H$$

where Bd2 is the beam at the second station.

17. The vessel of claim 16 wherein the immersed sectional area distribution further provides a volume with convex surfaces in the afterbody.

18. The vessel of claim 16 wherein the hull is a full displacement hull for use in a mode where wave-making characteristics are present.

19. A vessel comprising:
a hull having a forebody and an afterbody, wherein the hull is characterized by an immersed sectional area distribution providing a volume with concave surfaces in the forebody; and
wherein the immersed sectional area, An, at the first seven tenths of the distance from stem to stern, where n=1 through 7, and Ax is the maximum immersed cross sectional area, is substantially given as follows:

$$A1=(0.033)Ax$$

$$A2=(0.27)Ax;$$

$$A3=(0.57)Ax;$$

$$A4=(0.79)Ax;$$

$$A5=(0.92)Ax;$$

$$A6=(0.98)Ax; \text{ and}$$

$$A7=Ax.$$

20. The vessel of claim 19 wherein the immersed sectional area distribution further provides a volume with convex surfaces in the afterbody.

21. The vessel of claim 19 wherein the hull is a full displacement hull for use in a mode where wave-making characteristics are present.

22. The vessel of claim 19 wherein the hull comprises an original hull with appendages that modify a shape of the original hull.

23. The vessel of claim 22 wherein the appendages are sponsons.

24. A vessel comprising:
a hull having a forebody and an afterbody;
wherein the hull is characterized by an immersed sectional area distribution providing a volume with concave surfaces in the forebody and convex surfaces in the afterbody; and
further comprising a rise of the bow keel less than about 0.07 radians, extending from the stem to about 0.1 L aft of the stem to enable concave waterline profiles in forward sections of the hull.

25. The vessel of claim 24 wherein the hull is a full displacement hull for use in a mode where wave-making characteristics are present.

26. A vessel comprising:
a hull having a block coefficient less than about 0.6, a load waterline and a chine that is above the load waterline at a first waterline station, wherein the hull is characterized by second order of differences between waterline station offsets that are substantially represented by the following equations:

$$Delta2_1=0.33(B)$$

$$Delta2_2=-0.054(B)$$

$$Delta2_3=-0.11(B)$$

$$Delta2_4=-0.080(B)$$

$$Delta2_5=-0.042(B)$$

$$Delta2_6=-0.031(B)$$

$$Delta2_7=-0.056(B)$$

where $Delta2_n$ is the second order difference at the first seven waterline station offsets which are located at tenths of the distance from stem to stern, where n=1 through 7, and B is a maximum waterline beam.

27. The vessel of claim 26 wherein the hull is a full displacement hull for use in a mode where wave-making characteristics are present.

28. A vessel comprising:
a hull having a block coefficient greater than about 0.6, a load waterline and a chine that is below the load waterline at a first waterline station, wherein the hull is characterized by second order of differences between waterline station offsets that are substantially represented by the following equations:

$$Delta2_1=0.26(B)$$

$$Delta2_2=-0.0042(B)$$

$$Delta2_3=-0.077(B)$$

$$Delta2_4=-0.068(B)$$

$$Delta2_5=-0.062(B)$$

$$Delta2_6=-0.023(B)$$

$$Delta2_7=-0.064(B)$$

where $Delta2_n$ is the second order difference at the first seven waterline station offsets which are located at tenths of the distance from stem to stern, where n=1 through 7, and B is a maximum waterline beam.

29. The vessel of claim 28 wherein the hull is a full displacement hull for use in a mode where wave-making characteristics are present.

30. A vessel comprising:
a hull having a forebody having a first and second section, a chine, and an after body;
wherein the hull is characterized by an immersed sectional area distribution providing a volume with concave surfaces in the forebody, wherein:

$$(1.52)(2)[H(B2)-(0.27)Ax]/B2<H$$

where H is a design draft of the hull, B2 is an average of a beam at an immersed location of the chine and a beam at an immersed waterline at the second section, and Ax is a maximum immersed cross sectional area of the hull;
wherein the chine has a height at the first station that is below the design draft of the hull; and
wherein a beam of the first station at the design draft is substantially given as follows:

$$Bd1=[(0.13)(Ax)]/(H-K1),$$

where H is a design draft of the vessel, Bd1 is a beam of a first station at the design draft, Ax is a maximum immersed cross sectional area, and K1 is a height of a keel above a base line at the first station.

31. The vessel of claim 30 wherein the hull is a full displacement hull for use in a mode where wave-making characteristics are present.

32. A vessel comprising:
a hull having a forebody extending about 0.6 times a waterline length of the vessel from a stem, and an afterbody extending thereafter to a stern, wherein the hull is characterized by an immersed sectional area distribution providing a volume with concave surfaces in the forebody, and a stem that is raked forward so that waterlines from the stem to about 0.4 of the distance from the stem to stern form concave contours, and wherein the rate of change between immersed sectional areas of the bow per $\frac{1}{10}$ division of waterline length is substantially given as the following absolute values:

$n=1$: $\{|A_n-A_{n-1}|/(Ax)(0.1)\}=0.33$ $n=2$: $\{|A_n-A_{n-1}|/(Ax)(0.1)\}=2.4$ $n=3$: $\{|A_n-A_{n-1}|/(Ax)(0.1)\}=3.03$ $n=4$: $\{|A_n-A_{n-1}|/(Ax)(0.1)\}=2.2$ where n is a station corresponding to a $\frac{1}{10}$ division of waterline length, $A_n$, is the immersed sectional area at station n, and Ax is the maximum immersed cross sectional area.

33. The vessel of claim 32 wherein the hull is a full displacement hull for use in a mode where wave-making characteristics are present.

* * * * *